(12) United States Patent
Gwo

(10) Patent No.: US 6,548,176 B1
(45) Date of Patent: Apr. 15, 2003

(54) HYDROXIDE-CATALYZED BONDING

(75) Inventor: Dz-Hung Gwo, Richmond, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/325,995

(22) Filed: Jun. 4, 1999

Related U.S. Application Data

(63) Continuation-in-part of application No. 09/054,970, filed on Apr. 3, 1998, now Pat. No. 6,284,085.
(60) Provisional application No. 60/042,616, filed on Apr. 3, 1997, and provisional application No. 60/043,514, filed on Apr. 14, 1997.

(51) Int. Cl.$^7$ .............................................. B32B 31/06
(52) U.S. Cl. ................... 428/420; 106/286.7; 156/246; 156/3.9; 156/325; 206/568; 264/1.21; 359/793
(58) Field of Search .................. 156/325, 246, 156/319; 428/420; 106/286.7; 206/568; 359/793; 264/1.21

(56) References Cited

U.S. PATENT DOCUMENTS

| 2,015,972 A | * 10/1935 | Södergren .................... 206/568 |
| 2,384,269 A | * 9/1945 | Bake ............................ 156/3.5 |
| 3,007,832 A | * 11/1961 | Milne .......................... 156/325 |
| 3,409,198 A | * 11/1968 | Peterman ...................... 156/64 |
| 3,880,632 A | 4/1975 | Podvigalkina |
| 4,324,592 A | * 4/1982 | Patel et al. .................. 206/568 |
| 4,644,632 A | 2/1987 | Machler et al. |
| 4,824,807 A | 4/1989 | Blount |
| 4,908,339 A | 3/1990 | Blount |
| 4,945,074 A | 7/1990 | Blount |
| 5,238,518 A | 8/1993 | Okubi et al. |
| 5,332,432 A | 7/1994 | Okubi et al. |
| 5,413,620 A | 5/1995 | Henry |
| 5,574,811 A | 11/1996 | Bricheno et al. |
| 5,578,179 A | 11/1996 | Demorest et al. |
| 5,592,288 A | 1/1997 | Sampica et al. |
| 5,991,493 A | 11/1999 | Dawes et al. |
| 5,995,293 A | 11/1999 | Derkits, Jr. et al. |
| 6,117,794 A | 9/2000 | Dormer et al. |
| 6,122,115 A | 9/2000 | Plummer et al. |
| 6,129,854 A | 10/2000 | Ramsey et al. |
| 6,297,009 B1 | 10/2001 | Demorest et al. |
| 6,346,305 B1 | 2/2002 | Ramsey et al. |

FOREIGN PATENT DOCUMENTS

| DE | 4016808 | * 8/1991 | .................. 156/246 |
| JP | 4611996 | 3/1971 | |
| JP | 1165831 | 6/1989 | |
| RU | 703514 | 4/1977 | |
| SU | 703514 | * 12/1979 | ............... 106/286.7 |

OTHER PUBLICATIONS

2001 Ocean Optics, Inc., "Optical Components," Last modified: Jun. 13, 2002, retrieved on Jun. 13, 2002. Retrieved from the internet: <URL: www.oceanoptics.com/products/optics.asp>, p. 1 of 1.

"LaCroix Optical Co. Products," retrieved on Jun. 13, 2002. Retrieved from the internet: <URL: http://www.lacroixoptical .com/products.htm>, p. 1 of 1.

* cited by examiner

Primary Examiner—John J. Gallagher
(74) Attorney, Agent, or Firm—Lumen Intellectual Property Services, Inc.

(57) ABSTRACT

A method of bonding substrates by hydroxide-catalyzed hydration/dehydration involves applying a bonding material to at least one surface to be bonded, and placing the at least one surface sufficiently close to another surface such that a bonding interface is formed between them. A bonding material of the invention comprises a source of hydroxide ions, and may optionally include a silicate component, a particulate filling material, and a property-modifying component. Bonding methods of the invention reliably and reproducibly provide bonds which are strong and precise, and which may be tailored according to a wide range of possible applications. Possible applications for bonding materials of the invention include: forming composite materials, coating substrates, forming laminate structures, assembly of precision optical components, and preparing objects of defined geometry and composition. Bonding materials and methods of preparing the same are also disclosed.

46 Claims, 17 Drawing Sheets

HYDROXIDE-CATALYZED BONDING

RELATED U.S. APPLICATION DATA

This application is a Continuation-in-part of application Ser. No. 09/054,970 filed Apr. 3, 1998, now U.S. Pat. No. 6,284,085, which claims priority from provisional application Ser. No. 60/042,616 filed Apr. 3, 1997 and provisional application Ser. No. 60/043,514 filed Apr. 14, 1997.

STATEMENT OF FEDERALLY SPONSORED RESEARCH

This invention was supported by grant number NAS 839225 from NASA. The U.S. Government has certain rights in this invention.

BACKGROUND OF THE INVENTION

1. Field of the Invention

This invention relates to a bonding process involving hydroxide-catalyzed hydration/dehydration of substrate surfaces. This invention further relates to a highly reproducible, precision bonding method involving an alkaline hydroxide-ions-based bonding material. This invention still further relates to a bonding material composition; to a method of applying a bonding material to a surface; to a novel composite material; to a method of coating a substrate with a bonding material; and to a method of forming objects of a particular geometry from a bonding material.

2. Background of the Related Art

The bonding of materials is critical in making high performance instruments or devices. Depending on the particular application, the quality of a bonding method is judged on criteria such as bonding precision, mechanical strength, optical properties, thermal properties, chemical properties, and the simplicity of the bonding process. Three popular bonding methods of the prior art are optical contacting, epoxy bonding, and high temperature frit bonding. The salient features of each of these three prior art methods are summarized below.

Optical contacting is a room temperature process which employs no bonding material, and is thus suitable only for certain precision applications involving surfaces having reasonably good surface figure match. Ideally, if the bonding surfaces are thoroughly cleaned prior to bonding, the resulting interface will have low thermal noise and contain almost nothing susceptible to oxidation, photolysis, and/or pyrolysis. However, due to its sensitivity to surface particulate and chemical contamination (such as by air-borne contaminants) and other environmental factors (such as humidity), optical contacting produces bonds which are generally unreliable in strength. In addition, surface figure mismatch almost always exists to some extent. Consequently, strong chemical bonds rarely occur extensively across the interface, and voids are sometimes seen in the interface. Bonds produced by optical contacting do not consistently survive thermal shocks. Typically, optical contacting has a low first-try success rate. In case of failure, de-bonding usually degrades surface quality, and thus lowers success rate in re-bonding.

Epoxy bonding is usually a room temperature process and has a good success rate for regular room temperature applications. However, because epoxy bonding is typically organic based, the bonding is susceptible to pyrolysis (such as by high intensity lasers) and/or photolysis (such as by ultra-violet light) in high power density applications. The strength of the epoxy bond varies with temperature and chemical environment. Because the resulting wedge and thickness cannot always be precisely controlled, epoxy bonding is unsuitable for certain precision structural work. Epoxy bonding creates a relatively thick interface which makes optical index matching more of a concern in optical applications.

Frit bonding is a high-temperature process which creates a high-temperature rated interface. The interface is mechanically strong and chemically resistant in most applications. Because the frit material is physically thick and thus thermally noisy, it is unsuitable for precision structural work. For example, when optimized for bonding fused silica, frit bonding usually creates good coefficient of thermal expansion (CTE) matching with the bonded substrates at room temperature. The matching usually does not hold to a wider temperature range, however, resulting in strain and stress at or near the interface. Furthermore, a frit bond is opaque and inapplicable in transmission optics. Due to its high temperature requirement, frit bonding requires high temperature rated fixturing for alignment, and is thus expensive. Frit bonding is unsuitable if high temperature side effects, such as changes in the physical or chemical properties of the substrates, are of concern. Thus, each of the above prior art bonding methods has limitations and disadvantages.

U.S. Pat. No. 5,669,997 to Robbert et al. discloses a method of bonding optical or semiconductor members, in which grooves are formed in one of the surfaces to be bonded using high precision laser ablation. A low viscosity adhesive is provided in the grooves to allow chemical bonding of the members, essentially without the formation of an adhesive layer interface between the members.

U.S. Pat. No. 5,053,251 to Hara et al. discloses a method of repairing glass-lined equipment by a sol-gel process, the method including the repeated steps of applying a repair agent to a damaged area of the glass layer, and heating the repair agent for solidification and adherence to the glass. The '251 also discloses an apparatus for heating the repair agent at the damaged area.

U.S. Pat. No. 5,143,275 also to Hara et al. discloses an improved method for repairing a glass layer of glass-lined equipment, in which a metallic fiber-containing sheet is disposed on the metal substrate of the damaged area, and welded to the metal substrate. A repairing agent may be supplied to the metallic sheet, and the damaged area heated to about 300° F. to 350° F.

U.S. Pat. No 3,007,832 to Milne discloses the sealing of joints between flexible sheets of alkali-soluble cellulosic material by applying a solution of alkali to the cellulosic material, and pressing the surfaces of the cellulosic material together. The incorporation of urea as a plasticizer in the sheet to be sealed allows superior sealing using lower concentrations (3–4%) of alkali.

U.S. Pat. No. 3,409,198 to Peterman discloses a bonding apparatus, including scanning means for detecting the presence on mating surfaces of surface roughness or contaminants which impede the bonding of the mating surfaces.

Japanese patent no. 3255-603-A to SONY Corp. discloses the junction of single-crystal ferrite and polycrystalline ferrite in which at least one hydroxide of K, Rb and Cs is formed at the junction interface of at least the polycrystalline ferrite.

Soviet Union/Russian reference SU 703-514 to RSFSR discloses a binder composition for building applications, comprising a mixture of 0.1 to 1.0% by weight of a metal sulphate (e.g., sodium sulphate), 1.0 to 10% by weight of alkali hydroxide (e.g., sodium hydroxide), and ground glass (the balance).

The present invention provides bonding methods and compositions which have numerous advantages over prior art methods and materials.

SUMMARY OF THE INVENTION

Accordingly, it is an object of the present invention to provide a method for producing bonds which are as precise and transparent as optical contact bonds and which also have the strength and reliability of frit bonds. It is a further object of the invention to provide such a bonding method which may be performed simply and inexpensively either at room temperature or over a broad temperature range.

One feature of the invention is that it provides an effective but simple and inexpensive precision bonding method. Another feature of the invention is that it provides a bonding method for substrate surfaces having surface figure mismatch. Another feature of the invention is that it provides a bonding method for substrate surfaces having good surface figure match. Another feature of the invention is that it provides a composite material including a bonding material. Another feature of the invention is that it provides a method of forming a composite material including a bonding material. Another feature of the invention is that it provides a method of coating a substrate surface with a bonding material.

One advantage of the invention is that it provides a reliable method for assembling Precision optical, optomechanical, and mechanical components. Another advantage of the invention is that it provides precision and non-precision bonding methods which can be performed under ambient conditions in air. Another advantage of the invention is that it provides a bonding interface which is thermally, optically, and electrically thin. Another advantage of the invention is that it provides a bonding interface which is resistant to organic solvents, and extremes of pH.

Another advantage of the invention is that it provides a bonding interface which is resistant to a powerful laser beam. Another advantage of the invention is that it provides a method for bonding a wide variety of substrate materials with a bonding material in which the substrate materials are insoluble. Another advantage of the invention is that it provides a method for forming an object having a specific composition and a defined geometry. Another advantage of the invention is that it provides a method of forming a multi-layered structure. Another advantage of the invention is that it provides a method for forming a wide range of composite materials.

These and other objects, advantages and features are accomplished by the provision of a method of assembling a system, including the steps of: a) providing first and second components having respective first and second surfaces to be bonded, wherein at least one of the first and second components is selected from the group consisting of optical components and optomechanical components; b) providing a bonding material including water and a source of hydroxide ions; c) applying the bonding material to at least one of the first and second surfaces; d) aligning the first and second components to form a bonding material interface between the first and second surfaces; and e) while maintaining alignment of the first and second components, curing the bonding material interface.

These and other objects, advantages and features are accomplished by the provision of a method of forming an object having a particular geometry, comprising the steps of: a) providing a bonding material comprising a silicate material and a source of hydroxide ions; b) providing a mold for the object to be formed, wherein the mold comprises at least one surface; and c) placing the bonding material on the at least one surface.

These and other objects, advantages and features are accomplished by the provision of a method of forming a composite material, including the steps of: a) providing at least one porous substrate material having a plurality of pores therein; b) applying a bonding material to the at least one porous substrate material, wherein the bonding material comprises a source of hydroxide ions; and c) curing the bonding material to form the composite material.

These and other objects, advantages and features are accomplished by the provision of a method of coating a substrate, including the steps of: a) providing a substrate; b) applying at least a first coating of bonding material to at least one surface of the substrate, wherein the bonding material comprises a source of hydroxide ions selected from the group consisting of ammonia water, calcium hydroxide, potassium hydroxide, sodium hydroxide, strontium hydroxide, sodium ethoxide, and sodium polymetaphosphate; and c) at least partially curing the at least a first coating of bonding material applied in step b).

According to one embodiment of the invention, there is provided a method for bonding a first surface to a second surface through hydroxide-catalyzed hydration and dehydration, in which hydroxide ions are applied to at least one of the surfaces and the first and second surfaces are then placed sufficiently close to each other to allow bonding between the first and second surfaces. The hydroxide ions are preferably contained in an alkaline aqueous solution which is applied to at least one of the surfaces. Materials which function as a source of hydroxide ions when in aqueous solution include: sodium hydroxide, potassium hydroxide, calcium hydroxide, strontium hydroxide, ammonia water, and sodium ethoxide. In certain applications, weaker alkaline chemicals (e.g., sodium polymetaphosphate) may be included as a source of hydroxide ions. Sodium polymetaphosphate serves to slow down the rate of hydroxide catalysis, as compared with use of, e.g., aqueous potassium hydroxide alone.

According to one embodiment of the invention, each surface to be bonded is preferably a surface of a material that can form a silicate-like network, and/or that can be chemically linked to a silicate-like network by means of hydroxide-catalyzed hydration and dehydration. When hydrated, both of these two categories of materials feature surface hydroxyl (—OH) groups. If one or both of the surfaces to be bonded do not meet either of the aforementioned chemical criteria, rough or porous surfaces may be physically adhered to a substrate by means of a silicate-like network. The silicate-like network may be formed either by the bonding material alone or by the bonding material together with a substrate surface to be bonded. As an example of physical adherence, an elongated, somewhat rigid silicate-like network may enter a pore on an adjacent substrate and act as an anchor via electrostatic forces, hydrogen bonds, and/or van der Waals' bonds. Of course, in some cases, both chemical bonding and physical adherence may be involved at the same time.

The expression "silicate-like network" refers to essentially a chemical-bond network similar to, but looser than, the bulk structure of silicon dioxide. In other words, the three-dimensional network is based on siloxane bridges (Si—O—Si) with each silicon atom serving as a tetrahedral_center bonded to four oxygen atoms. However, the network is looser as compared with silicon dioxide, because it has more embedded and exposed silanol groups (Si—OH) and Si—O⁻M⁺ groups (where M⁺ denotes a cation) as local terminating groups of the network.

Examples of materials capable of forming a silicate-like network by means of hydroxide-catalyzed hydration and dehydration include: silica (e.g., fused silica, fused quartz, natural quartz), silicon having a thermally-grown surface oxide layer, Zerodur™, ULE™, borosilicate, BK7 glass, SF5 glass, SK11 glass, opal, granite, and other silica-based or silica-containing materials, including certain laser crystals. Of these materials, silica generally forms silicate-like networks most efficiently.

Examples of materials which cannot themselves form, but can be linked to, a silicate-like network by means of hydroxide-catalyzed hydration and dehydration include:

i) metals and alloys: including aluminum, brass, copper, iron, nickel, niobium, mild steel, stainless steel, SXA foam, Stablcell™, titanium, tungsten, zirconium;

ii) oxides of the above listed metals: including alumina, copper oxide, iron oxide, nickel oxide, niobium oxide, titanium oxide, zirconia; and iii) crystals: including calcite ($CaCO_3$), sapphire, Yttrium Aluminum Garnet (YAG, $Y_3Al_5O_{12}$), and many other laser crystals.

The above list is not intended to be exhaustive. Additional materials that can be bonded according to the instant invention are listed hereinbelow.

According to the invention, each substrate surface may be cleaned prior to bonding. For bonding substrate material(s) that can form silicate-like networks in situ, if the surface figure match between the surfaces to be bonded is favorable, an alkaline solution containing a suitable concentration of hydroxide ions, but substantially or completely lacking silicate material, may be employed as the bonding material. For substrate materials that cannot generate silicate-like networks through hydroxide catalysis, or cannot generate silicate-like networks at a sufficient rate for a given surface figure mismatch, a silicate material may be included in the bonding material. Thus a bonding material used in the practice of the invention may include a source of hydroxide ions, and a silicate material. In either case, the bonding material may be described as a hydroxide-ions-based bonding material.

Regardless of whether substrate materials to be bonded are capable of forming silicate-like networks, the settling time (or settling period) in precision bonding of substrates having good surface figure match may be controlled by adjusting the concentration of hydroxide ions and silicate material in the bonding material. During the earlier portion of the settling time, surfaces which have been joined using bonding material according to the invention may be separated fairly easily. However, after the expiration of the settling period, attempted separation of bonded substrates, and re-bonding of the substrates, may be problematic. According to the invention, curing is normally incomplete after the expiration of the settling period.

If the surface figure match between the surfaces to be bonded is unfavorable, bonding coverage may be improved by including a filling material as a component of the alkaline hydroxide-ions-based bonding material. The filling material can be in the form of particulates, powders, foams, and/or a liquid. Such a filling material can facilitate bridging any interface gaps between substrate surfaces. Such a filling material preferably includes at least one material that can be hydrated to have exposed hydroxyl groups, and which can be chemically linked through hydroxide catalysis to a silicate-like network. The silicate-like network may be either generated in situ from the filling material and/or substrate material, or may be originally present in the bonding material. The composition of the bonding material may be adjusted to some extent in order to control the settling time. Advantageously, according to one embodiment of the invention, bonding may be performed at room temperature.

Bonding methods according to various embodiments of the invention are applicable to both precision and non-precision bonding. Precision bonding and non-precision bonding may be distinguished on the basis of alignment precision of substrates to be bonded in the direction approximately normal to the bonding interface. Precision bonding implies that the two substrates to be bonded make good direct contact with each other, and are in a bistability-free configuration. Non-precision bonding implies otherwise. In precision bonding, the bonding contact configuration is essentially determined by the surface figure match/mismatch of the substrates to be bonded, rather than by factors that interfere with the thickness of the interface. These latter factors include effects due to the nature of the bonding material, and the presence of contaminants in the interface.

In practice, precision bonding usually applies to substrates having substantially exact surface figure match. The presence of a filling material in the bonding material does not necessarily preclude precision bonding. In some situations, precision bonding may be performed on substrates lacking good surface figure match. In this case, precision bonding may begin with making good direct contact between the surfaces to be bonded prior to applying a bonding material. Again in this case, the bonding material may include filling materials, such as particulates and powders, which would interfere with bonding material thickness between substrates having good surface figure match.

Although there may be no clear-cut demarcation between precision and non-precision bonding, the following three types of bonding may be recognized, for convenience, under the invention:

(A) precision bonding using bonding materials that do not interfere with interface thickness;

(B) non-precision bonding using bonding materials that do not interfere with interface thickness (e.g., when precision is affected by contaminants and/or contact bistability);

(C) non-precision bonding using bonding materials that interfere with interface thickness.

The characteristics of bonds formed according to each of the above categories depend on factors such as surface figure match/mismatch, build-up of bonding material at the interface, as well as bonding coverage at the interface. Each of these factors are related to one another.

Category (B) is at least to some extent a quality control issue. Regarding categories (A) and (C), regardless of surface FIG. match/mismatch, methods of the invention provide 100% bonding coverage, and 100% fill factor is expected by default unless otherwise stated.

In view of the above, unless otherwise stated, the expression "precision bonding" as used herein generally implies good surface figure match between surfaces to be bonded; and the expression "non-precision" bonding generally implies poor surface figure match.

In either precision or non-precision applications, various additives or property-modifying materials can be included in the bonding material in order to modify the physical and/or chemical properties of the bonding material, e.g., at the interface between the bonded substrates.

The above and other objects, advantages and features of the invention will be set forth in part in the description which follows and in part will become apparent to those having ordinary skill in the art upon examination of the following, or may be learned from practice of the invention. The advantages of the invention may be realized and attained as particularly pointed out in the appended claims.

DETAILED DESCRIPTION OF THE PREFERRED EMBODIMENTS

A. Principles

The reactions of hydration and dehydration can be described by the following chemical equation:

(1)

where X and Y are symbols of chemical elements or chemical structures. The forward reaction is hydration, and the reverse reaction is dehydration. When X and Y represent the same chemical element or structure, Eq. (1) becomes:

(2)

The hydration and dehydration processes described by Eqs.(1) and (2) can be catalyzed by $H^+$, $OH^-$, and/or Group IA metal ions. In the absence of any catalyst, the activation energy $E_a$ of the dehydration process ranges from a few to several eV, depending on the nature of X and Y. Via hydroxide catalysis, $E_a$ can be lowered, in some cases to less than a few $k_B T$, where $k_B$ is Boltzmann's constant and T is the temperature in Kelvin. Therefore, the hydration and dehydration processes can readily occur at room temperature through hydroxide catalysis. Many different materials may serve as a source of hydroxide ions, e.g., in aqueous solution, according to the invention. Examples of such materials include: sodium hydroxide, potassium hydroxide, calcium hydroxide, strontium hydroxide, ammonia water (aqueous ammonium hydroxide), and sodium ethoxide. In certain applications, weaker alkaline chemicals (e.g., sodium polymetaphosphate) may be included as a source of hydroxide ions to purposely slow down the hydroxide catalysis.

In the case of a single surface, hydration and dehydration occur, as described by Eq.(2), with both elements or structures X on the same substrate surface. More specifically, for a single fused-silica surface, the equation for hydration and dehydration under hydroxide catalysis becomes:

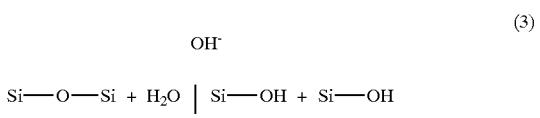
(3)

Figure 1:
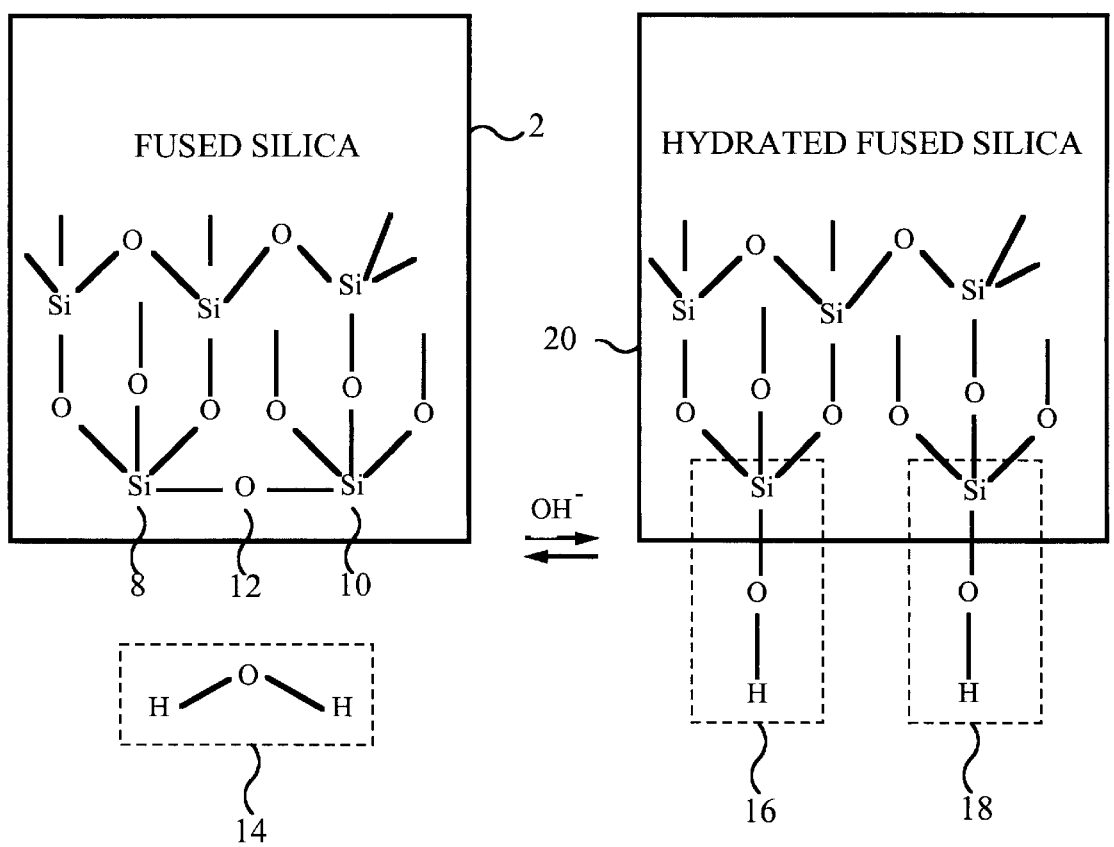
FIG. 1 is a schematic diagram illustrating the concept of hydration and dehydration of a single surface.

As illustrated in FIG. 1, fused silica 2 comprises a network of Si—O—Si bridges. When fused silica 2 is exposed to water ($H_2O$) and hydroxide ions ($OH^-$), silicon atoms 8 and 10 and oxygen atom 12 can be hydrated by water molecule 14 to form two Si—O—H structural groups 16 and 18. Similar reactions can occur to a limited extent on an alumina surface according to the following equation:

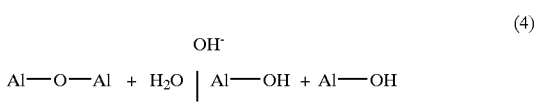
(4)

Figure 2A:
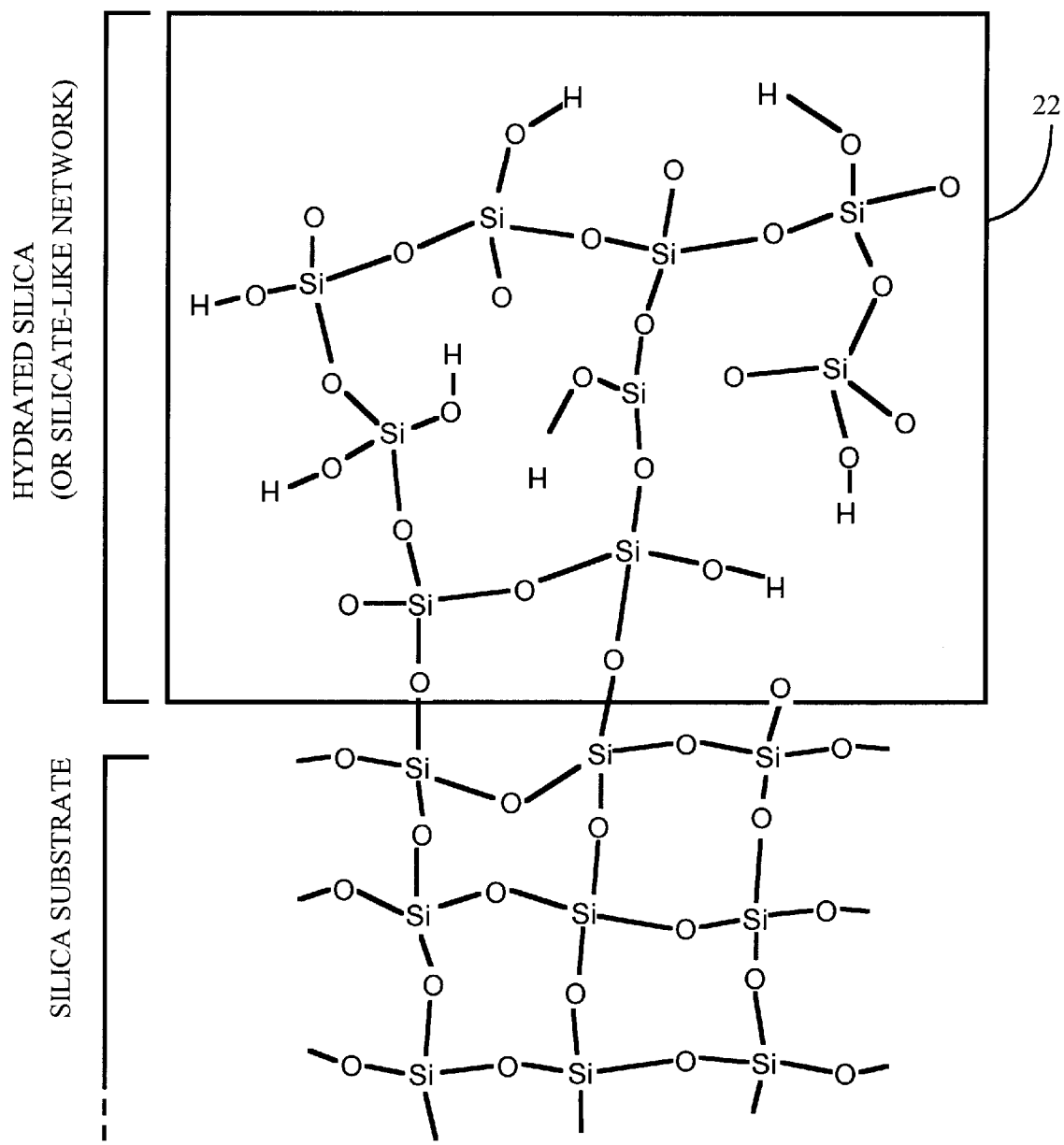
FIG. 2A is a schematic diagram illustrating a material that forms a silicate-like network through hydroxide-catalyzed hydration and dehydration.
Figure 2B:
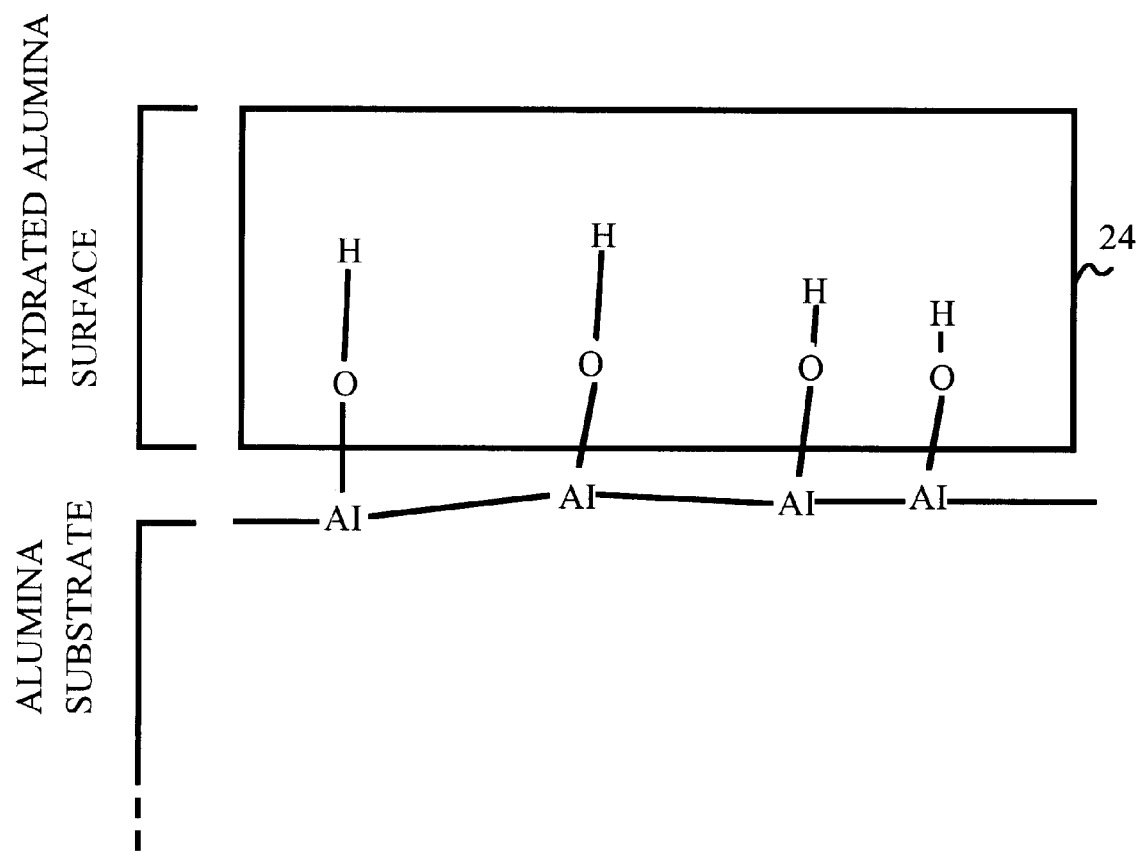
FIG. 2B is a schematic diagram illustrating a material that can be chemically linked to a silicate-like network through hydroxide-catalyzed hydration and dehydration.

Referring to FIGS. 2A–2B, one difference between fused silica and alumina is that fused silica can form a relatively thick three-dimensional silicate-like network 22, as shown in FIG. 2A, through hydroxide-catalyzed hydration and dehydration. In comparison, alumina usually forms only a quasi two-dimensional layer 24 of Al—O—H structures on its surface, as shown in FIG. 2B. A quasi two-dimensional layer may be defined as a structure whose dimension perpendicular to the substrate surface is much smaller than its dimensions parallel to the substrate surface.

Figure 3A:
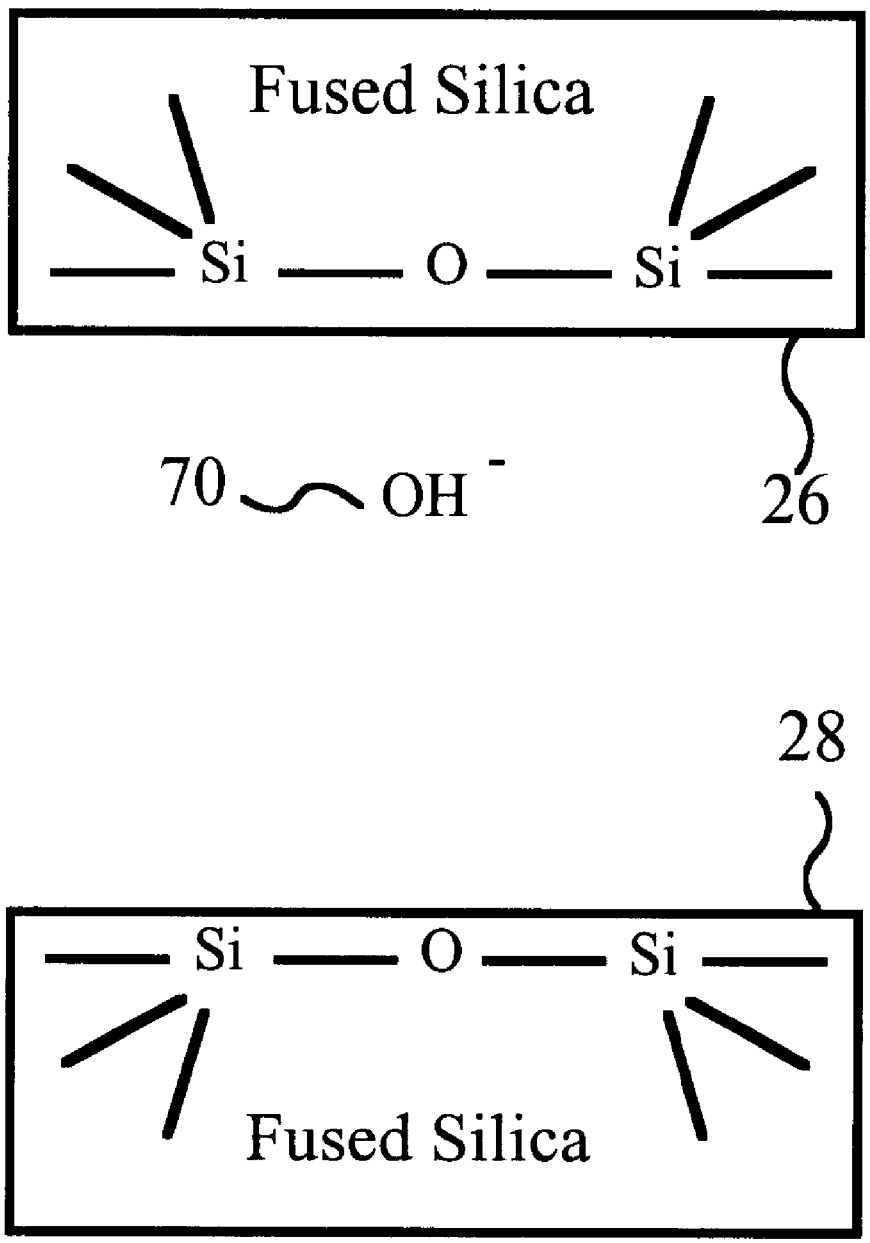
FIGS. 3A–3C are schematic diagrams showing the bonding of two surfaces through hydroxide-catalyzed hydration and dehydration.
Figure 3B:
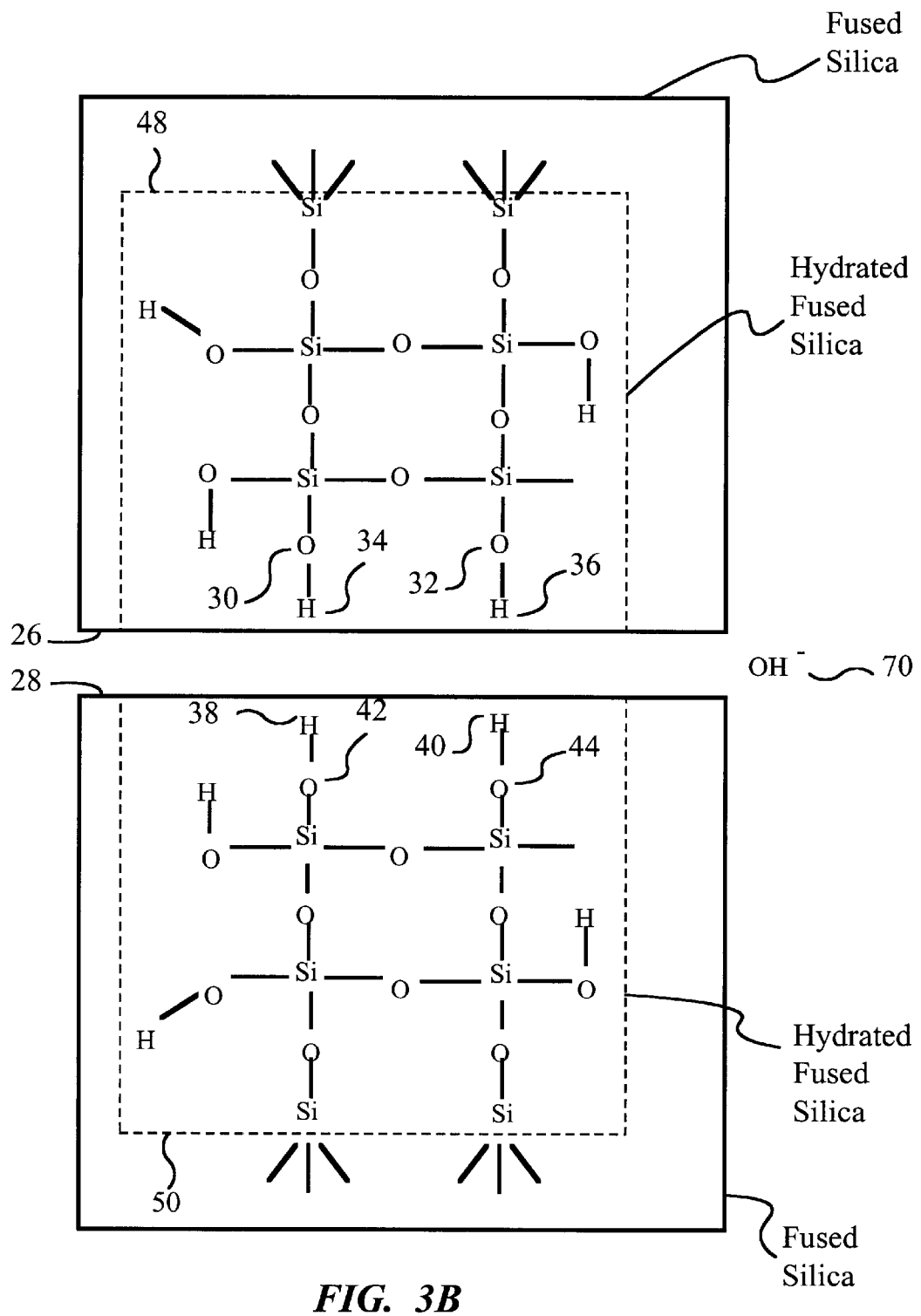
Figure 3C:
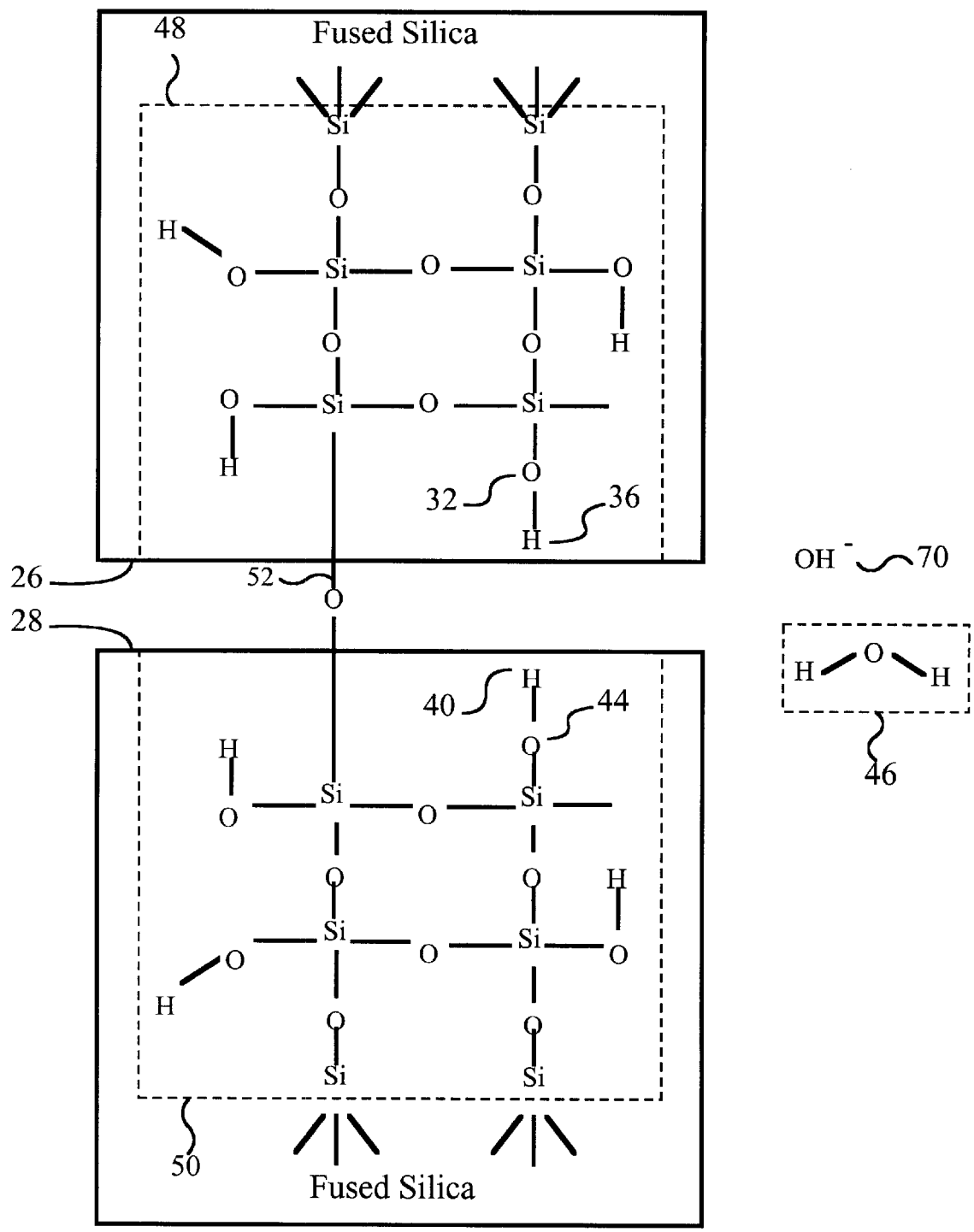

FIGS. 3A–3C schematically represent bonding of two fused-silica surfaces 26 and 28 by hydroxide-ion-catalyzed hydration and dehydration. As shown in FIGS. 3A–3C, if fused-silica surfaces 26 and 28 are exposed to water and a hydroxide ion 70, and surfaces 26 and 28 are then placed sufficiently parallel and close to each other, chemical bonding can occur between them through hydroxide-catalyzed hydration and dehydration. FIGS. 3A and 3B depict surfaces 26 and 28 of fused silica before and after surface hydration, respectively. However, the invention does not require surfaces 26 and 28 to be dehydrated prior to bonding. Thus, surfaces 26 and 28 may be hydrated to some extent, by various mechanisms, prior to hydroxide-catalyzed hydration.

Referring to FIG. 3B, if only surface 26 and its associated silicate-like network 48 were present during the subsequent dehydration, one oxygen atom and two hydrogen atoms would be removed from oxygen atoms 30 and 32 and hydrogen atoms 34 and 36 to form a water molecule, if sterically favorable. As shown in FIGS. 3B and 3C, however, if both surfaces 26 and 28 (and thus their associated silicate-like networks 48 and 50) are present, one oxygen atom and two hydrogen atoms from oxygen atoms 30 and 42 and hydrogen atoms 34 and 38 are released as water molecule 46, resulting in chemical bonding of surfaces 26 and 28, namely by formation of a Si—O—Si bridge 52. When such chemical bonding occurs extensively resulting in a large number of Si—O—Si bridges 52, surfaces 26 and 28 are bonded together with great strength.

The bonding mechanism of the invention has been described primarily with respect to hydroxide-catalyzed dehydration between two-silanol groups (SiOH) leading to a Si—O—Si bridge. However, there may be other less important and/or less effective bonding mechanisms involved, such as: a) electrostatic forces due to charges at the bonding interface, b) hydrogen bonds formed among surface hydroxyl groups and water molecules trapped in the interface, and c) weak van der Waals' forces, for example, if one or both surfaces to be bonded are contaminated by hydrophobic organic material or silicone oil.

Figure 4:
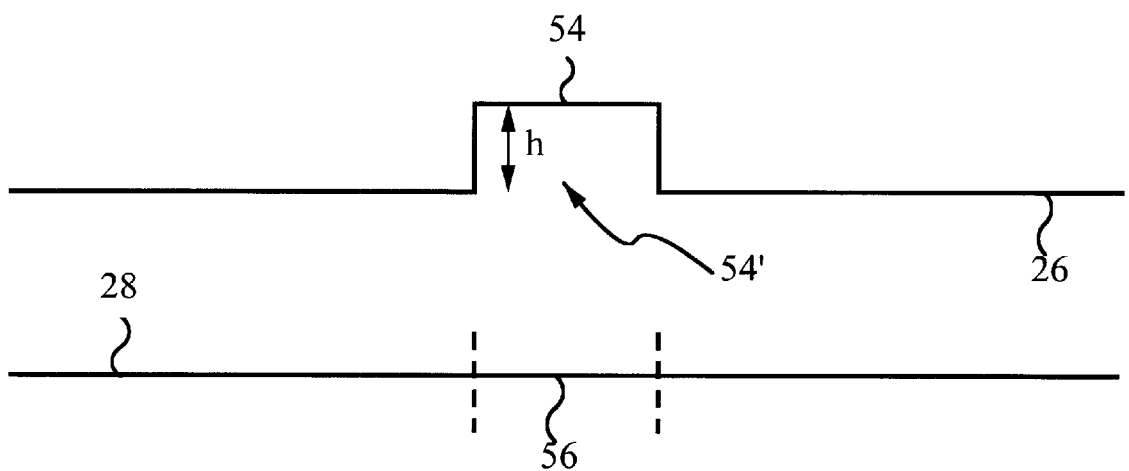
FIG. 4 is a schematic diagram illustrating a surface figure mismatch between two surfaces to be bonded.

The requirement that surfaces 26 and 28 be close enough to form bond 52 will now be discussed in more detail. If surfaces 26 and 28 are sufficiently flat and smooth, this requirement is met by simply placing the surfaces against each other. In reality, however, there is almost always surface figure mismatch, as schematically illustrated in FIG. 4. With reference to FIG. 4, regardless of how close surfaces 26 and 28 are to each other, region 54 of surface 26 is at least a distance h from region 56 of surface 28. If distance h is small, the three-dimensional silicate-like networks 48 and 50 (FIG. 5B) generated from surfaces 26 and 28 through hydroxide-catalyzed hydration and dehydration can then fill a gap 54' between regions 54 and 56.

However, the in situ generation of silicate-like network 48/50 could be too small and/or too slow to fill gap 54' within a period of time short enough to permit bonding between surfaces 26 and 28. Therefore, according to one embodiment of the invention, a silicate material, represented as 58 in FIG. 5A, may be included as part of the alkaline hydroxide-ions-based bonding material. According to one embodiment of the invention, silicate material 58 may be generated in a bonding material comprising silicon dioxide hydrated and dissolved in a high-pH aqueous solution. Alternatively, silicate material 58 may be in the form of a high-pH aqueous solution of one or more silicate salt(s).

Figure 5A:
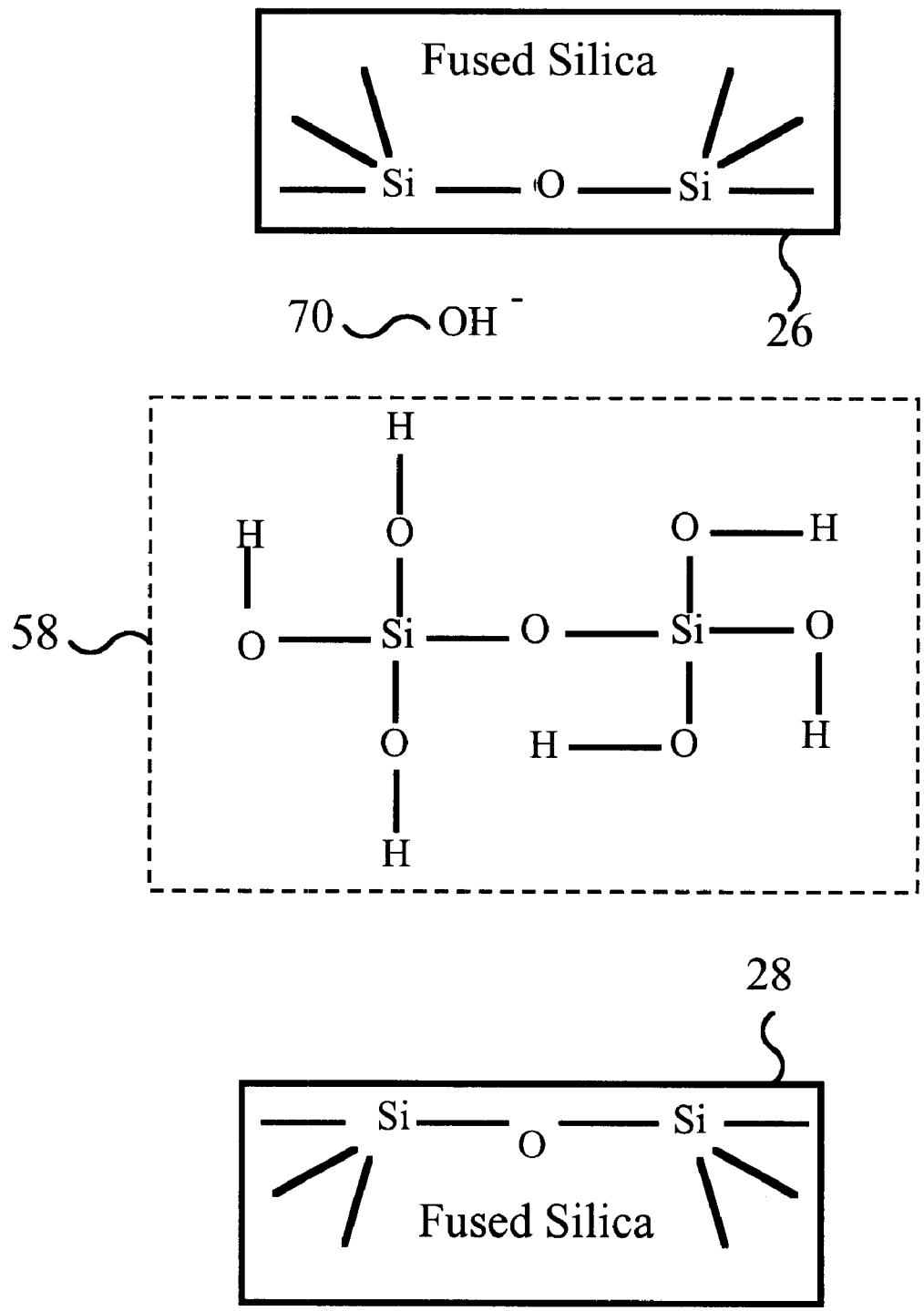
FIGS. 5A–5B are schematic diagrams illustrating the use of a silicate material as a filling material between surfaces to be bonded, according to another embodiment of the invention.

Conveniently, the bonding material at the interface of surfaces 26 and 28 may be cured at ambient temperature. Alternatively, depending on the application, composition, etc., the bonding material may be cured at a temperature above or below ambient-temperature extending over the range of at least from about 0° C. to about 1000° C. Although FIGS. 5A and 5B show both substrates as being silica, silicate material (e.g., 58) may be included as a component of the bonding material to bond other types of substrates (e.g., alumina, FIG. 2B) that can be hydrated to generate surface hydroxyl groups.

Apart from the chemical criteria of the bonding mechanism of the invention discussed above, in situations where surfaces to be bonded are physically rough or porous, there is a physical aspect to the bonding process in that a silicate-like network (e.g., 58, FIGS. 5A–B) may undergo steric adjustments in order to accommodate the particular configuration of one or both surfaces to be bonded. As already alluded to, the silicate-like network referred to herein may be derived either from a substrate surface to be bonded, or from a silicate component of the bonding material. In such a situation, where a silicate-like network is present either from a first substrate surface or from a silicate component of a bonding material, a second substrate having pits in its surface may be bonded to the first substrate surface without the requirement of a high surface density of hydroxyl groups on the second substrate surface.

Figure 5B:
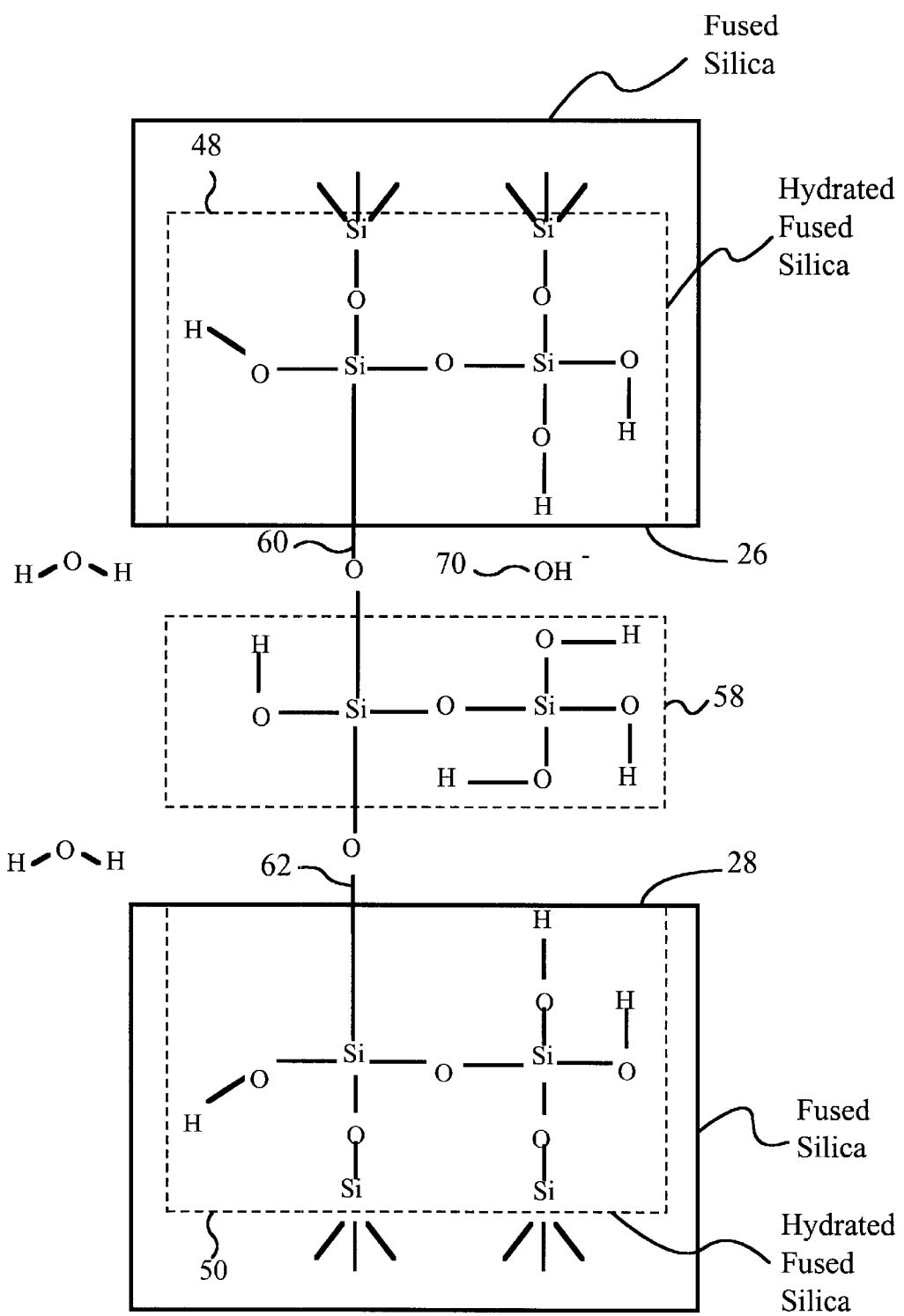

As shown in FIG. 5B, silicate material 58 and surfaces 26 and 28 may be hydrated with the aid of hydroxide ions 70. Chemical bond 60 between silicate-like network 48 and silicate material 58 is then formed via hydroxide-catalyzed dehydration. In this situation, silicate material 58 is itself equivalent to (another.) silicate-like network. Similarly, chemical bond 62 is created between silicate-like network 50 and silicate material 58. When such chemical bonding occurs extensively across a bonding interface, surfaces 26 and 28 are bonded together.

Bonding processes of the invention may be performed in air and at atmospheric pressure. The bonding process of the invention is applicable to both precision bonding and non-precision bonding of a wide range of substrate materials. As should be evident from the above discussion, bonding processes and methods according to the invention are not dependent on the substrate(s) being soluble in the bonding material. On the contrary, most of the bonding processes described herein according to the invention involve substrate materials that are insoluble or virtually insoluble in the bonding material.

To summarize in general terms the types of substrate materials that can be bonded according to the invention, bonding may depend on physical or chemical characteristics of substrate surfaces. Substrate surfaces having physical characteristics such as porosity or roughness are generally bondable according to the invention. Chemical characteristics of substrate surfaces bondable according to the invention are as follows:

i) substrates inherently having surface hydroxyl groups;

ii) substrates treated or treatable to bear surface hydroxyl groups; and iii) substrates which can generate surface hydroxyl groups under the influence of hydroxide-catalyzed hydration.

According to the invention, and based on the reverse reaction of equation (1), the curing process is essentially a process of lowering the water content of the bonding materials. According to Le Chatelier's Principle, the greater the water loss from the bonding interface, the more effective the bonding becomes. Therefore, the curing can be done in many ways, such as, using heat treatment, low-pressure treatment, desiccation (e.g., in a desiccator), etc., or simply by leaving the system to be bonded (or bonded system) under ambient conditions for an extended period of time. The term "bonded system" as used herein includes the substrate surfaces to be bonded together with bonding material present at the interface between the substrates.

Bonds formed according to the invention may be rendered more resistant to chemicals and/or humidity by means of various treatments of the bonded system. For example, after the curing process has been completed, the edges of the cured interface, between substrates having good surface figure match, may be rinsed with water to effectively remove at least some of the exposed hydroxide catalyst. Alternatively, rinsing the edges of the interface with a slightly acidic aqueous solution may dissolve and neutralize the hydroxide content at, or adjacent to, the interface periphery. By removing residual hydroxide catalyst from around the periphery of the bonding interface, the effective activation energy for de-bonding of the bonded surfaces, at or adjacent to the interface periphery, ranges from about 1 or 2 to several eV, i.e., approaching the original catalyst-free value. Since the value of $k_B T$ at room temperature is about two orders of magnitude lower than one eV, de-bonding at room temperature becomes more difficult. In other words, appropriate rinsing can provide a "sealing" effect, in the case of precision bonding.of substrates having good surface figure match, around the edge of the interface. A bond which has been "sealed" in this manner may then withstand exposure to water or under-water environments.

Precision bonding, according to the present invention, may be divided into three categories depending on the nature of the substrate materials to be bonded, and in particular on whether, or at what rate, each of the two substrates are capable of generating a silicate-like network via hydroxide catalysis. The three categories will be described in turn to provide further insights into the bonding mechanism(s) of various types of substrates.

Category I: Precision bonding of either similar or dissimilar substrate materials, each of which can generate silicate-like network(s) through hydroxide catalysis.

There are two subcategories of Category I, depending on 1) the degree of surface figure match/mismatch between the surfaces of the substrate materials, and 2) their rate of silicate-like network build-up via hydroxide catalysis. If the surface figure mismatch is relatively small, and the rate of silicate-like network generation via hydroxide-catalyzed surface hydration is relatively high (subcategory IA), bonding will usually take place with or without A silicate component in the bonding material. That is to say, for certain applications, silicate material is an optional component of the bonding material.

When the surface figure mismatch of substrates to be bonded is such that gap(s), e.g., 54' (FIG. 4), between two surfaces are too large to be filled by silicate-like networks generated from the substrate materials themselves, it is preferable to include silicate component as part of the bonding material (subcategory IB).

The inclusion of a silicate component in the bonding material does, however, affect the settling time of the bonding process: the settling time is decreased by the inclusion of silicate, and settling time is roughly inversely proportional to the concentration of silicates in the bonding material. Here, the settling time refers to the time needed for the bonding to become so strong that it is impossible to manually separate the bonded substrates without leaving tenacious bonding material residue on the substrate surfaces, and/or without causing permanent damage to at least one of the substrate surfaces.

Substrate materials of category I include, without limitation: silica (such as, fused silica, fused quartz, natural quartz), silicon having a thermally-grown surface oxide layer, Zerodur™, ULE™ (an ultra-low thermal expansion coefficient glass), borosilicate, BK7™ glass, SF5™ glass, SK11™ glass, opal, granite, and other silica-based or silica-containing materials, including certain laser crystals. Of these materials, silica generally forms silicate-like networks most efficiently. Zerodur™ is a glass ceramic material having a crystalline phase and a glassy phase. ULE™ is composed of about 92.5% silicon dioxide and about 7.5% titanium dioxide. What was stated above regarding the inclusion of a silicate component in a bonding material used to bond substrate materials of Category I applies to situations where the substrate materials to be bonded are the same (e.g., borosilicate to borosilicate) or different (e.g., borosilicate to fused quartz).

Category II: Precision bonding of either similar or dissimilar substrate materials, only one of which can generate a silicate-like network through hydroxide catalysis, the other being capable of generating only a quasi two-dimensional layer of surface hydroxyl groups (—OH) through hydroxide catalysis or being capable of maintaining a pre-existing quasi two-dimensional layer under the influence of hydroxide ions.

The situation regarding the inclusion of a silicate component in the bonding material as described above for Category I also applies to Category II. However, in the case of Category II, because only one surface is capable of generating a silicate-like network, it takes longer to fill an interface gap of a given size. Again, when the mismatch is sufficiently small and the silicate-like network generated in situ is adequate to fill any surface figure mismatch, the application of a silicate material is optional. Similar to category I, the settling time for category II generally decreases as the concentration of silicate material in the bonding material increases.

Examples of materials that can be bonded under Category II of the invention include:

i) metals and alloys: including aluminum, brass, copper, iron, nickel, niobium (a superconductor), mild steel, stainless steel, SXA foam, Stablcell™, titanium, tungsten, zirconium;

ii) oxides of the above listed metals: including alumina, copper oxide, iron oxide, nickel oxide, niobium oxide, titanium oxide, zirconia;

iii) crystals: including calcite ($CaCO_3$), sapphire, Yttrium Aluminum Garnet (YAG, $Y_3Al_5O_{12}$), and many other laser crystals.

Category III: Precision bonding either alike or dissimilar substrate materials each of which can generate only a quasi two-dimensional layer of X—O—H structures, or can maintain a pre-existing quasi two-dimensional X—O—H layer under the influence of hydroxide ions.

In Category III none of the substrates can generate a silicate-like network. Since it is highly unlikely that the respective surfaces to be bonded will have extended surface figure match at the atomic scale, for bonding of substrates of category III, the inclusion of a silicate component as part of the bonding material is much preferred, according to the instant invention.

In summary, if the surface figure match is favorable (as in many precision applications), two substrate material(s) at least one of which can form silicate-like networks in situ at a sufficient rate via hydroxide catalysis may be bonded using a bonding material comprising an alkaline aqueous solution containing hydroxide ions, in the absence of silicate material. Substrate material(s) that cannot generate a silicate-like network at or above a minimum rate may be bonded using a bonding material containing both a source of hydroxide ions and a silicate component.

When the surface figure mismatch of substrates to be bonded is seriously unfavorable, and when good bonding coverage is required (as in certain non-precision applications), a filling material may be included as a component of the bonding material to facilitate bridging any gaps between substrate surfaces. The filling material may include at least one material that can be hydrated to have surface hydroxyl groups which can be chemically linked through hydroxide catalysis to a silicate-like network of the bonding material, to surface hydroxyl groups of the substrate(s), and/or to exposed hydroxyl groups of the filling material. Again, the silicate-like network may be either generated in situ during the bonding process from the filling material and/or substrate materials to be bonded, or may be originally contained in the bonding material.

As a generalization, a bonding material of the invention may include a single type of chemical source of hydroxide ions (e.g., KOH) or a mixture of two or more types of chemical sources of hydroxide ions (e.g., a mixture of NaOH and KOH). Similarly, a bonding material of the invention further includes a silicate component may include one silicate material or a mixture of two or more silicate materials; and a bonding material which includes a filling material component may include one or more different filling materials.

Filling material components of a bonding material of the invention may be in a form of powders, particulate materials, foams, or liquids of various viscosity. Furthermore, a bonding material of the invention may include one or more property-modifying components, as will be described in detail hereinbelow. A large variety of compositions are therefore possible for a bonding material according to the invention. Variations in the composition of hydroxide-ions-based bonding materials according to the invention provides a considerable degree of flexibility in fine tuning the physical and/or chemical properties of the cured bonding material for specific applications. Thus, filling materials and/or property-modifying materials having various properties may be selected to determine the physical or chemical characteristics of the cured bonding material, e.g., at the interface of bonded substrates. For example, particulate forms (e.g., powders) of aluminum, iron, silica, or alumina, either alone or in combination, may be used as a filling material to determine such properties (of the interface) as: electric conductivity, thermal conductivity, and elasticity.

According to another embodiment of the invention, a property-modifying component may be in the form of a soluble or dispersible material which is added to the bonding material to determine the optical transmission/absorption spectrum of the cured bonding material. According to another embodiment of the invention, powders of appropriate particle-size distribution may be included in the bonding material to control the optical-scattering loss of the cured bonding material.

Apart from the inclusion of a silicate component, filling material components, and/or property-modifying components in a hydroxide-ions-based bonding material, additional hydrophilic and/or hydrophobic components may be added to the hydroxide-ions-based bonding material to create a bonding material or bonding interface with novel properties. For example, according to various embodiments of the invention, bonding interfaces may be designed to possess sensitivity to humidity or to certain chemicals.

B. Processes & Embodiments

For convenience of presentation, bonding processes of the invention may be categorized as precision bonding and non-precision bonding. Unless otherwise stated, the expression "precision bonding" as used herein generally implies good surface figure match between surfaces to be bonded; while the expression "non-precision" bonding implies the existence of uncertainty in the bonding contact configuration, and usually implies poor surface figure match. However, precision bonding can apply to bonding of substrates having a bistability-free bonding contact configuration but poor surface figure match (for example, in assembling a precision achromatic lens doublet with only the edges of the two lenses in contact).

B.1 Precision Bonding

In precision bonding, global surface figure match of surfaces to be bonded is generally far more important than micro-roughness of the surfaces. Exceptions to this generalization include situations in which light scattering loss is of concern. In fact, bonding of an optical-quality surface to a fine-ground surface, as well as bonding between two fine-ground surfaces, have both been successfully demonstrated using the bonding method of the present invention.

In precision bonding according to the invention, the thickness of the bonding interface is generally a function of surface figure mismatch of substrate surfaces to be bonded, and/or to the specification of the filtering element used in preparing the bonding material. Of course, when a suitable filling material is included in the bonding material, relatively large build-up of bonding material at the interface is possible (e.g., in the case of precision bonding of substrates lacking good surface figure match). Filling materials capable of providing large interface build-up include various types of particulate materials or powders. Aqueous solutions having higher concentrations (at least about 10%, by weight) of silicate salts and/or hydrated silicon dioxide also permit large interface build-up. Interface build-up of bonding material to a thickness of up to about 1 cm is possible.

For precision bonding using certain (e.g., viscous) bonding materials that can potentially interfere with the interface thickness, substrate contact should be made prior to applying the bonding/filling material, regardless of surface figure match/mismatch. In these cases, bonding material can be applied via, e.g., capillary effect in the interface (when the interface gap is adequately small), or appropriate liquid suction techniques and liquid containment techniques (when the interface gap is relatively large).

When the bonding/filling material is of low viscosity and does not potentially interfere with interface thickness, the bonding material may be initially delivered to one or both surfaces to be bonded by pipetting, atomization, spin-coating, or other means, before contacting the substrates.

To maximize bonding coverage, the bonded system may be placed in a low pressure environment for a period of time during the settling time in order to remove any air which may have been trapped in the interface. Preferably, the pressure is just low enough to remove any trapped air (it is not suggested to employ a vacuum for this purpose). Since the interface may not always be amenable to visual monitoring, it is preferable to perform the low-pressure treatment during the settling time, for example, when both substrates are optically opaque.

A safe and convenient approach for curing the bond is simply to leave the bonded system under ambient conditions. Otherwise, curing can be accelerated by lowering the water content of the bonding material, such as by heat treatment, low pressure treatment, desiccation (e.g., blowing dry gas over the bonded system, or using a desiccator), etc. However, for precision bonding applications, such treatments may lead to problems with the bonded system. For example, premature heating of incompletely cured bonding material at a temperature in excess of about 1000° C. may cause boiling of bonding materials having a relatively high water content.

Similarly, low-pressure treatment, desiccation, or even mild heat treatment could lead to intolerable inhomogeneity of the bonding material. Vacuum baking, if needed, are preferably restricted to the final stage of curing. Of course, all aspects of the bonding process, including treatments aimed at accelerating cure rate, should be assessed in terms of the performance requirements of the bonded system.

For certain (e.g., less critical) applications, the bonded system may be heat treated by baking in a household microwave oven (for example, 700 Watt at 2.45 GHz). Of course, if metal and/or semiconductor substrate(s) are involved, they should be electrically grounded during such baking. Again, microwave heating should be performed only after most of the water molecules in the original bonding material are removed from the bonding interface. Therefore, microwave baking is generally not performed until a few to several days after the bond settles. One advantage of microwave heat treatment is that, when the substrates have little or no water content, the heating is water- and thus interface-specific. In addition, the heating profile resulting from microwave baking is essentially symmetric about the interface. In other words, the corresponding temperature gradient across the interface is essentially zero; therefore, the associated thermal stress is minimized.

As an example, a precision fused-silica/fused-silica bond with a circular interface of 2.5 cm in diameter can be microwave-baked for half an hour about four days after the bond settles. This treatment typically shortens the remaining curing cycle by a factor of two or more. (Without heat treatment it may take several weeks for such a sample to cure.) Maximum bond strength of such a bonded system is usually several tens of Mega-Pascal (MPa) when properly bonded. Because of the high strength of such bonded systems, even during the curing cycle, the bonding interface can survive regular manipulation only a few hours after the bond settles, and can survive wet substrate machining a week later without any degradation in the final bonding performance.

Generally, bonding and curing processes of the invention may be performed at ambient temperature or at temperatures above or below ambient temperature, or at a combination of different temperatures at, above, or below-ambient, provided that there is no degradation in the bonding material and final performance of the bonded system as a result of the temperature of the curing regime. In the case of bonding two dissimilar substrate materials having relatively large differences in their coefficient of thermal expansion (CTE), bonding, curing, and/or storing the bonded system at the targeted operating temperature of the application will tend to reduce mechanical strain and/or optical stress in the bonded system.

According to one embodiment of the invention, in order to maximize the success rate of the bonding process, at least part of the bonding method is preferably performed in a clean environment, such as a cleanroom, or a hood equipped with suitable filters (e.g., HEPA filters). In a clean environment, such as a cleanroom, the presence of any particulates can be recorded, while the temperature and humidity can be maintained and monitored.

Furthermore, the surfaces to be bonded, as well as any equipment which may be used in the bonding process, are preferably cleaned beforehand. Cleaning the surfaces to be bonded can maximize the surface population of hydroxyl groups and the intrinsic surface hydrophilicity, minimize the surface hydrophobicity (such as that caused by certain organic and/or silicone contaminants), and minimize surface particulate contamination (e.g., dust). In general, the surface cleanliness requirements (with respect to non-particulate chemical contaminants) for the bonding process of the invention are less stringent than those required for optical contacting.

The extent and type of any cleaning performed prior to bonding processes of the invention may depend on factors such as the nature of the substrate material(s), the particular application, and any targeted contaminant(s). Examples of cleaning processes which may be performed in conjunction with bonding methods of the invention include: deionized air cleaning, $CO_2$ snow cleaning, ultraviolet-ozone cleaning, solvent touch-off, solvent rinsing, spin cleaning with various cleaning agents and/or solvents, ozone/hydrogen peroxide cleaning, ultrasonic cleaning, RCA Clean cleaning (see, for example, W. Kern, Solid State Technol. 15(1), 34 (1972); W. Kern, Solid State Technol. 15(2), 39 (1972); W. Kern and D. Puotinen, RCA Rev. 31, 187 (1970)). Cleaning treatments used in the art for cleaning glass surfaces may also be used in conjunction with bonding methods of the invention (see, for example, L. Holland, *The Properties of Glass Surfaces*, Ch.5. Wiley, New York, 1964).

In the majority of non-critical applications, a final visual inspection of surfaces to be bonded for the presence of particulate contaminants can be quickly done with the help of strong oblique illumination of visible light. Such visible light may be from a source having little or no infrared output, since IR may cause non-uniform heating, and non-uniform thermal expansion of the substrates to be bonded, and thus residual mechanical stress around the interface when cured.

Optionally, depending on the intended application of the bonded system, the edge of the cured bonding interface can be rinsed with water and/or slightly acidic aqueous solution to reduce the hydroxide content around the edge of the interface. In this way the bond's resistance to chemicals and/or humidity is greatly improved. This approach has the advantage in precision bonding of providing a thinner periphery of the bonding interface. Since hydroxide ions are highly soluble in water, in many cases water rinsing alone is exceedingly effective. If an acidic aqueous solution is to be used for rinsing the periphery of the cured bonding interface, the pH can be as high as between 5 and 7.

To further improve the durability of the bond, appropriate post-curing surface covering and/or derivatization can be conducted according to the requirements of specific applications. For example, the periphery of the cured bonding interface can be chemically derivatized to become hydrophobic. Hydrophobicity generally results in better water resistances. As an example, a straightforward method for surface derivatization to create hydrophobicity involves treating the exposed interface periphery of bonding material with hexamethyldisilazane at room temperature. Other techniques for surface chemical derivatization are well known in the art. Alternatively, in less critical applications, a hydrophobic covering, such as a thin layer of silicone oil, may be applied to the interface. Silica substrates having good surface figure match which were precision bonded according to the invention, have withstood immersion in pure water for at least two years with no observable degradation in bonding performance. For many applications, treatments of the periphery of the bonding interface, such as surface derivatization of the bonding material, are unnecessary.

As an example of precision bonding according to the invention, fused-silica (and/or fused-quartz) substrates, both having good optical surface qualities (with scratch/dig better than 80/60) and good surface figure match (better than approximately 200 nm), may be precision bonded generally as follows. In cases where the bonding material is an alkaline aqueous solution, the minimum required volume of bonding material is normally about 50 nL/cm² of interface area, assuming negligible volume loss to the (usually chamfered) area just outside the interface circumference via capillary action. (It is normally preferred that fused-silica substrates are chamfered around the surface to be bonded in order to prevent the edge of the surface from being chipped inadvertently: a fused-silica fragment chipped from the substrate could strongly adhere to the surface(s) to be bonded, and thus interfere with the bonding process.) If the volume of bonding material is less than about 50 nL/cm² of interface area, there may be a risk of premature bonding caused by inadvertent optical contacting before correct alignment of the substrates is achieved. To minimize the chances of inadvertent optical contacting caused by certain unexpected factors between the surfaces to be bonded, a volume of about 150 nL or more per square-centimeter of the interface area is preferred in this example. Essentially there is no upper limit for the volume of the bonding material, because: a) the effective volume is limited by the volume of the interface gap in precision applications, and b) excess volume of bonding material outside the interface normally does not degrade the bonding performance. However, a volume close to the minimum volume stated above should be used if deposition of the bonding material around the edge of the interface is of concern.

Sodium hydroxide and potassium hydroxide may each be used as a hydroxide-ions-generating component of a bonding material for precision bonding according to various embodiments of the invention. A currently preferred concentration range of NaOH or KOH is from less than 1% to approximately 15% by weight. For example, an aqueous solution of KOH at a concentration of less than 1% (by weight) was used in assembling the nearly-fused-quartz-only NASA/Stanford Gravity Probe B science instrument. Preferably, the ZOH:H$_2$O molar ratio for a bonding material of the invention is in the range of about 1:5000 to about 1:25; more preferably in the range of about 1:2000 to about 1:50, and-most preferably about 1:1000 to about 1:200, where ZOH represents KOH or NaOH.

Some differences between NaOH and KOH as applied to bonding fused silica or fused quartz according to the invention are as follows:

(1) Bonding resulting from KOH is expected to have a higher temperature rating than that using NaOH.

(2) KOH is less aggressive in terms of hydration than NaOH. Therefore, KOH provides higher recoverability of bonding surfaces in case de-bonding is necessary, for example, when misalignment occurs before the bonding settles.

(3) KOH generally results in higher mechanical bonding strength than does NaOH.

(4) After the bonding material is cured, excess pure KOH solution generally causes no particulate residue around the periphery of the interface. Excess NaOH solution may lead to residue around the periphery of the interface after curing.

As another example, an aqueous bonding solution containing NaOH 2.7% (by weight) and hydrated SiO, 5.2% (by weight) was used in the early development of the fused-quartz Gravity Probe B science instrument. A bonding material of the invention can also be prepared by diluting a concentrated and highly alkaline aqueous solution of sodium silicate with water. Although such a sodium silicate solution provides bonding similar to that resulting from use of an aqueous solution of hydroxide alone, there are two distinctive differences. Namely, sodium silicate results in a shorter settling time and increased deposition of residue around the interface after the bond is cured, as compared with hydroxide solution alone. Both differences are related to the content of hydrated SiO$_2$, which serves to establish the silicate-like network via hydroxide catalysis before the hydroxide-catalyzed surface hydration effectively starts playing a role in helping establish more silicate-like network. For example, in creating a 2.5-centimeter diameter fused-silica/fused-silica interface, the settling time for 0.6% KOH aqueous solution is around half an hour. In comparison, the settling time for an aqueous bonding solution containing 2.7% NaOH and hydrated 5.2% SiO$_2$ is only tens of seconds.

Therefore, by appropriate adjustment of the concentrations of NaOH/KOH and hydrated SiO$_2$, a bonding material having any required intermediate settling time can be prepared. One advantage of a longer settling time is that it allows more time for precision lateral alignment of the substrates after the bonding material has been dispensed and the bonding contact has been made. However, shorter settling time may be advantageous for certain applications.

Bonding material may be dispensed to substrate surfaces to be bonded in various ways. Other than pipetting and any liquid transfer technique based on contact-capillary effect, bonding materials may also be dispensed to substrate surfaces by atomization (aerosol), spin-coating, etc. Of course, the bonding material may be dispensed to only one substrate or to both substrates, and thus the interface can even be immersed in the bonding material, if necessary. When bonding material is dispensed to substrate surfaces by pipetting or any liquid transfer technique based on contact-capillary effect, the actual number of drops of bonding material and the locations of the drops may be selected based on factors such as the interface area and the interface geometry. The interface geometry affects the initial volume loss at the area just outside the interface due to capillary action. The capillary effect helps spread out the bonding material at the interface when the two substrate surfaces are face-to-face and in gentle contact. Therefore, the locations of these drops of bonding material should be chosen such that there is no air gap trapped at the interface.

It is generally preferable to have the bonding interface aligned substantially horizontally during the bonding process. In many cases, in order to avoid premature bonding, such as inadvertent optical contacting, no extra interface compression is employed other than that caused by the gravity weight of the upper substrate. However, extra interface compression may be needed, at least during the settling time, if the gravity weight either fails to maintain bonding alignment, or fails to overcome a "floating" effect at the interface due to surface tension effects of the bonding material. That is to say, for certain applications it may be preferable to avoid applying extra interface compression, especially when the upper substrate is already sufficiently heavy. However, when the upper substrate is too light, or causes non-uniform interface compression through its mass distribution, additional interface compression may be applied to ensure that the interface is free from wedging during the settling and curing processes. If such precautions are not taken, imperfect bonding coverage may result.

If necessary, the substrate surfaces may be aligned laterally (relative to the normal of the interface) with fixturing prior to application of the bonding material. During pre-bonding alignment, thin, uniform, and non-contaminating shim(s) (such as certain shim stock and polymer thin film) can be used to separate the two substrate surfaces to avoid inadvertent optical contacting and/or surface damaging due to frictional sliding and scratching. Such shims should be clean and should not leave contaminating residue.

To date, most of the precision bonding performed according to the invention, using various substrate materials, has been performed in a Class-100 clean environment. The bonding surfaces have created typically sub-micron surface figure mismatch over interface areas ranging from a few square millimeters to about 400 square centimeters. In precision bonding of substrates having good surface figure match, the minimum interface thickness has, to date, been limited only by the surface figure mismatch, and the filter element used in preparation of the bonding material. The minimum interface thickness for bonding performed according to the invention is expected to be ca. 0.1 to 0.2 nm. For many precision applications, the bonding interface preferably has a thickness in the range of from about 0.1 nm to about 2 μm. In practice, a bonding interface of the invention was shown by scanning electron microscopy (SEM) to have a thickness of ca. 10 nm or less. Additional interface wedging caused by the bonding material is typically on the order of 0.05 arc-second per centimeter of interface dimension.

According to the instant invention, precision bonding with nearly perfect surface figure match has been demonstrated on the following materials: silica (e.g., fused silica, fused quartz), silicon having a thermally-grown surface oxide layer, Zerodur™, ULE™, borosilicate, BK7 glass, SF5 glass, SK11 glass, and certain laser crystals such as sapphire, Yttrium Aluminum Garnet (YAG, $Y_3Al_5O_{12}$), and calcite. Strong bonds were made between all of the above mentioned materials having optical-quality substrate surfaces, i.e., in situations where physical bonding mechanisms (via surface roughness and/or porosity) play essentially no role in bonding strength. The effectiveness of the chemical bonding mechanism of the invention is thus confirmed. The above listing of materials for precision bonding is not intended to be exhaustive or to limit the invention in any way.

B.2 Non-precision Bonding

Many of the statements made hereinabove with respect to precision bonding are also applicable to non-precision bonding. For example, bonding material dispensing methods, curing processes, and optional post-curing treatments already described with reference to precision bonding may also apply to non-precision bonding.

According to various embodiments of the invention, bonding materials of the invention may also refer to, and be used as:

a) coating materials (where the bonding material is used to provide a single or multiple coating on a substrate);

b) molding materials (where the bonding material is applied to a bonding or non-bonding surface of a mold); and c) coating/molding materials (where a first substrate surface is a bonding substrate surface, and a second substrate surface comprises a non-bonding surface of a mold).

Non-precision bonding according to the invention has been successfully demonstrated for substrates having a surface figure mismatch of at least 1 cm. When gaps (e.g., 54', FIG. 4) between surfaces to be bonded are large, a step-wise build up of bonding material may be performed to promote curing of the bonding material. For example, several layers of bonding material may be successively applied to a substrate surface, and each layer sequentially cured, at least to some extent, prior to application of the next layer of bonding material. Such multiple layers of bonding material may have a thickness ranging from less than 10 nm to more than 1 cm.

For non-precision bonding, although use of a clean room might be unnecessary, it is still important to ensure the bonding surfaces are chemically clean to maximize the efficiency of the chemical bonding mechanism. Whereas in many precision bonding applications particulate matter is to be avoided, in non-precision bonding a solid filling material (e.g., a powdered or granular particulate filling material) and/or a relatively viscous liquid filling material may be included as part of the bonding material in order to maximize the fill factor, and to facilitate bridging the interface gap between surfaces to be bonded. Furthermore, a particular property-modifying material may be included as a component of the bonding material in order to impart certain useful characteristics to the bonding material.

Figure 6:
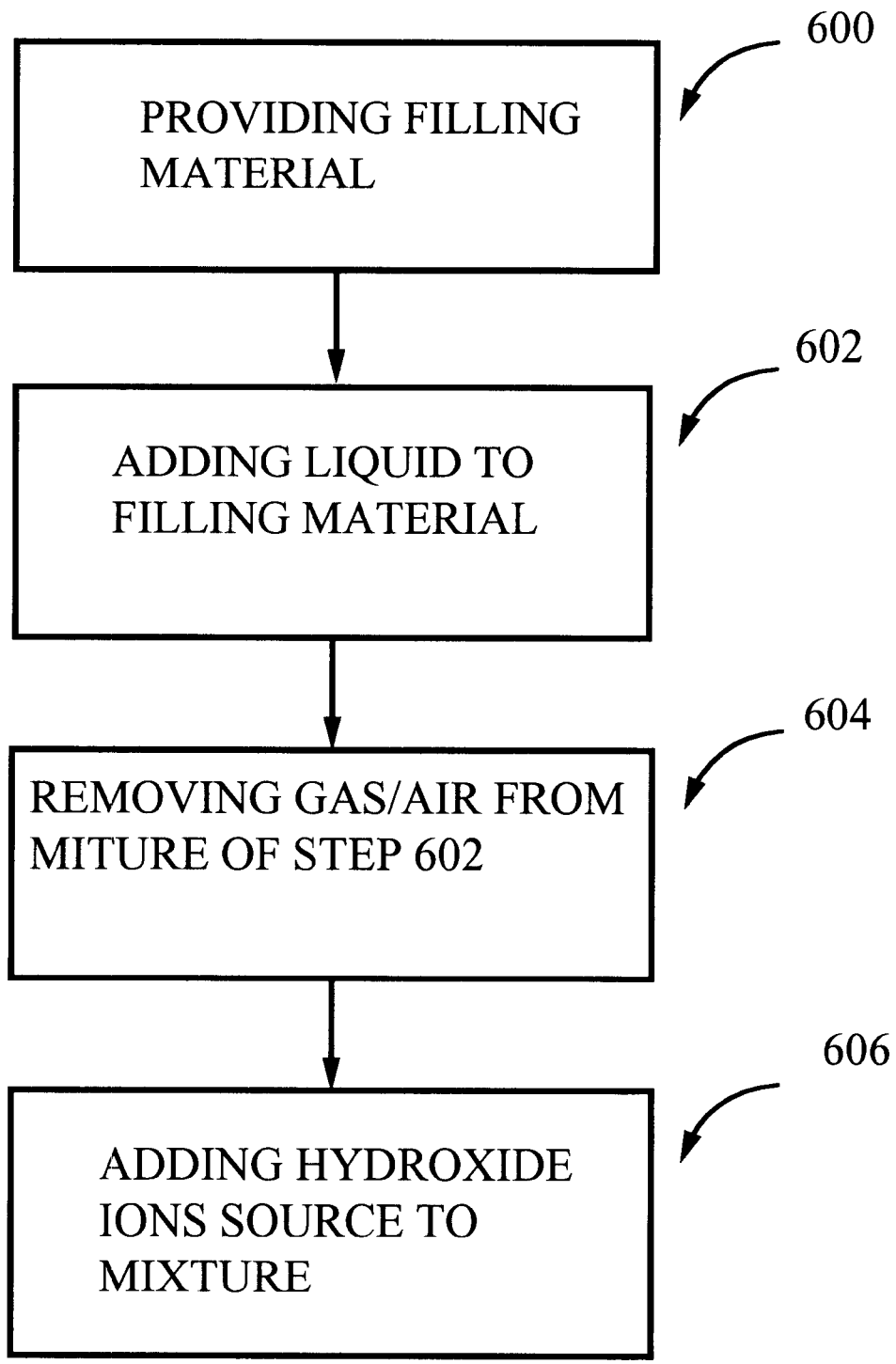
FIG. 6 schematically represents a series of steps involved in a method of forming a bonding material, according to another embodiment of the invention.

A bonding material which includes particulate filling material may be prepared as a viscous slurry, as is described fully hereinbelow (FIG. 6). A bonding material of the invention, with or without a particulate filling material component, may be based on a relatively viscous liquid, such as a concentrated and highly alkaline aqueous solution of hydrated $SiO_2$, or a concentrated and highly alkaline aqueous solution of sodium silicate. Such viscous liquid bonding materials may function as filling materials, e.g., to bridge any interface gaps, when cured.

Similar to precision bonding, non-precision bonding can be made between two dissimilar materials having a large difference in their coefficient of thermal expansion (CTE). Maintenance of the bonding system at the target operating temperature of the intended application from the time at which the bonding process is initiated tends to reduce mechanical strain and/or optical stress around the resulting bonding interface between dissimilar materials. However, maintaining such a temperature regime is less critical in non-precision bonding than in precision bonding, particularly when the bonding material has a certain degree of elasticity. Examples of bonding materials exhibiting elasticity are those based on aqueous solutions containing about 15% NaOH and more than about 20% hydrated $SiO_2$, both by weight.

One example of an application for a bonding method of the invention is assembly of an achromatic doublet lens system, which consists of a positive and a negative lens which make contact only at the periphery of the surfaces to be bonded. Such bonding of a doublet lens system may be regarded as precision bonding between substrates which purposely lack good surface figure match. In this case, a relatively viscous bonding material can be confined to the periphery by the two bonding surfaces being brought merely into edge-contact. Although the two lenses are made out of crown glass and flint glass, respectively, the effects due to CTE mismatch can be alleviated to a great extent by the slight springiness of the resulting bonding material. As compared with systems using harder (less elastic) bonding materials of the prior art, bonded systems of the invention can withstand a wider temperature range without mechanical failure.

According to another embodiment, bonding materials and methods of the invention may be used in the assembly of more complex and/or compact optical systems (e.g., triplet lenses). For example, after being cured between two optical elements (e.g., lenses, filters, polarizing elements, mirrors, etc.) which serve as bonding substrates, a bonding material of the invention itself forms a refractive optical element (e.g., a lens). According to another embodiment of the invention, a bonding material may be molded into an optical element, either stand-alone or bonded to another optical element which serves as a bonding substrate). The transmission spectrum of such an optical element formed by a bonding material of the invention may be tailored by including in the bonding material certain soluble or dispersible materials, e.g., compounds having particular types of chromophores.

The degree of springiness or elasticity of the cured bonding material may be tailored-by adjusting its thickness and water content. In general, the thinner the bonding material, the more rigid or inelastic it is; and the lower the water content of the cured bonding material, the less elastic it is. Therefore in precision bonding applications, after the elasticity of the cured bonding material has been adjusted, exposed areas of the bonding material are preferably isolated from the environment (e.g., sealed).

According to the invention, in order to prevent or retard degradation of the cured bonding material, a hydrophobic covering may be applied, or hydrophobic surface derivatization of the exposed surface of the bonding material may be performed, as was described hereinabove.

Alternatively, surface derivatization of exposed bonding material may be performed using methods analogous, or similar to, those well known in the art for derivatization of glass and semiconductor surfaces. Of course, additional surface covering or surface derivatization can be performed to maximize the robustness of the bonded system. For example in certain applications, the surface of any exposed bonding material may be made hydrophilic again after the initial hydrophobic treatment.

Bonding methods of the invention are applicable to numerous substrate materials, such as those meeting the surface chemical requirements as described hereinabove (e.g., in Section A. Principles), as well as substrates having physically rough or porous surfaces. Thus the invention is applicable to an extremely broad range of materials. For example, the following materials have been successfully bonded according to methods and processes of the invention, in either a homo- or hetero-configuration:

i) metals and alloys: including aluminum, brass, copper, iron, nickel, niobium, mild steel, stainless.steel, SXA foam, Stablcell™, tin/lead alloy, titanium, tungsten, zirconium;

ii) oxides of the above listed metals: including alumina, copper oxide, iron oxide, nickel oxide, niobium oxide, titanium oxide, zirconia;

iii) plastics and polymers: such as, Delrin™, Lucite™, rubbers, polystyrene, polypropylene;

iv) crystals: including calcite ($CaCO_3$), natural quartz, sapphire, Yttrium Aluminum Garnet (YAG, $Y_3Al_5O_2$)

v) siliceous and glass-like materials: including silica (such as, fused silica, fused quartz, natural quartz), BK7, borosilicate, Pyrex, SF5, SK11, ULE™, Zerodur™;

vi) semiconductors and miscellaneous materials: including aluminum nitride, indium nitride, gallium nitride, gallium arsenide, germanium, granite, silicon (including wafers with naturally or thermally grown oxide layers), ceramics, and many other semiconductor-oxide-based and/or semiconductor-oxide-containing materials.

B.3 Summary of Bonding Material Components

Depending on factors such as the nature of the substrate materials to be bonded, the surface figure mismatch, and the particular application, a bonding material according to the instant invention may include Component I alone, Components I and II, Components I and III, Components II and III, or Components I, II, and III.

Component I consists essentially of a source of hydroxide ions. Component I is typically dissolved in water. As an example, component I may include one or more of the following alkaline materials: sodium hydroxide, potassium hydroxide, calcium hydroxide, strontium hydroxide, ammonia water, and/or sodium ethoxide. Component I may also contain, or consist of, other weaker alkaline chemicals, e.g., sodium polymetaphosphate. The latter compound may be used to purposely slow down the rate of hydroxide catalysis in certain applications. The counter cations (of hydroxide ions) of the above named alkaline materials may also be used to tailor various properties of the bond. In general, Component I can be either combined with water, or can be combined with Component II.

Component II is a silicate component. The silicate component may be in the form of:

a) a high pH aqueous solution containing hydrated silicon dioxide which is dissolved and/or suspended as a colloid in a high-pH aqueous solution, or b) a high pH aqueous solution of a silicate salt, such as sodium silicate and/or other silicates (e.g., silicates of other alkali metals).

Component III represents a diverse group of materials, including various filling materials and/or property-modifying materials. For example, Component III may include any material, in any form, which increases the fill factor of a bonding material of the invention, or which confers or imparts one or more desired properties to the bonding material. For example, to increase the fill factor of a bonding material, Component III may be in the form of a particulate material (e.g., granular or powdered material), or in the form of a rigid or semi-rigid foam structure (e.g., sponge-like material, SXA foam, Stablcell™.

According to another embodiment, a property-modifying component of a bonding material may be included to impart characteristics such as thermal or electrical conductivity to a bonding material of the invention. Component III may also include powders of various metals, alloys, semiconductors, insulators, etc. Component III may also include a pigment, dye, or colorant. For example, in order to tailor the optical transmission/absorption spectrum across a bonding interface, Component III may include materials having a particular chromophore. Many other types of materials which may be included as a Component III material in a bonding material composition of the invention will be apparent to the skilled artisan.

Component III may include one or more materials bondable by the bonding technique of the instant invention. In this way the fill factor is maximized, and the mechanical strength of the bonding material is preserved. Component III may thus include one or more of the bondable materials listed hereinabove (Subsections B.1 and B.2), and/or materials containing these aforementioned materials. Examples of such bondable materials which may be used as a filling material in particulate form are: powdered alumina, powdered silica, powdered silicon, sand, clay particles, iron filings, and various metal powders (e.g., powdered iron, powdered copper, or powdered aluminum).

According to one embodiment of the invention, Components I and II, or each of the three Components I–III may be provided to the consumer (e.g., packaged) separately. For example, Components I–III may be provided as a multi-component bonding material kit. The consumer may then combine Components I–III as appropriate to form various bonding materials depending on the particular requirements of the consumer. Thus, each of generic bonding materials A–D outlined below may be prepared from a single bonding material kit according to the invention.

A. Bonding material A consists essentially of a source of hydroxide ions and an aqueous liquid.

B. Bonding material B comprises Component I, and a silicate Component II, e.g., in the form of a silicate material in high pH aqueous solution. Similar to bonding material A, bonding material B does not contain a filling and/or property-modifying material (Component III).

C. Bonding material C includes a filling and/or property-modifying material, Component III, in addition to Component I of bonding material A, but lacks Component II. However, Component III may include a silica-based or silica-containing material, e.g., powdered silica.

D. Bonding material D includes a filling and/or property-modifying material, Component III, in addition to the hydroxide-ions-generating and silicate material of bonding material B.

B.4 Methods

FIG. 6 outlines a series of steps involved in a method of preparing a bonding material according to one embodiment of the invention. Step 600 involves providing a filling material. Preferably, the filling material is a solid particulate (e.g., granular or powdered) material. The filling material may comprise at least one material bondable by the bonding technique of the invention, e.g., fused silica, fused quartz, or borosilicate, to mention just three examples. Some additional materials bondable by the technique of the invention are presented under sections B.1 and B.2, supra. The filling material provided in step 600 may also include a material that is not bondable by the technique of the invention. Thus, a filling material provided in step 600 may include at least two materials, at least one of which is bondable by the technique of the invention, and one of which is not bondable by the technique of the invention. Exemplary filling materials include, without limitation, particulate forms and/or powders of various oxides (e.g., sand, clay, silica, alumina, zirconia, iron oxide); semiconductors (e.g., silicon, germanium); metals (e.g., iron, copper, aluminum, niobium, stainless steel); rubbers, plastics and polymers; or various combinations of these materials.

A particulate or powdered filling material, included in a bonding material of the invention, may have dimensions in the range of at least from about 1 $\mu$m to about 1 cm. The preferred dimensions for a particulate filling material of the invention depend on factors including the composition of the bonding material, and the application.

Step 602 involves adding a liquid to the filling material to provide a liquid/filling material mixture. A liquid added to the filling material is preferably an aqueous liquid. According to a currently preferred embodiment, the liquid added to the filling material is water (e.g., tap water), deionized water, or distilled water. Preferably, step 602 involves adding liquid to the filling material in an amount suitable for forming a slurry or suspension by mixing the liquid with the filling material. A property-modifying component, capable of imparting a particular physical or chemical property to the bonding material, may be included as a component of the liquid/filling material mixture. As an example, a property-modifying component may be a compound which exhibits a particular absorption or transmission of electromagnetic radiation. Such a property-modifying component may be either soluble or insoluble in the bonding material, and may be either bondable or not bondable by the technique of the invention. Optional step 604 involves purging unwanted gas from the liquid/filling material mixture. For example, step 604 may involve removing or eliminating trapped air bubbles in the liquid/filling material mixture. Trapped air may be purged from the liquid/filling material mixture by a number of techniques, e.g., by mechanical agitation, centrifugation, partial evacuation, application of heat, etc.; or by a combination of such techniques. These and other techniques for purging gas are well known in the art.

Step 606 involves adding a source of hydroxide ions to the filling material/liquid mixture to provide a bonding material of the invention. According to a currently preferred embodiment, the source of hydroxide ions includes an aqueous liquid (suspension, colloid, or solution). The source of hydroxide ions added in step 606 may include a silicate material. The source of hydroxide ions and a silicate material can be in the form of a high pH aqueous solution of hydrated silicon dioxide, or a high pH aqueous solution of certain silicate salts.

Step 606 is preferably performed immediately before the final bonding material is needed. Provided that there is no reaction, or only a slow reaction, between a) the filling material and/or a property-modifying component, and b) the source of hydroxide ions and/or silicate materials, the source of hydroxide ions and/or silicate materials can be included in the liquid which is added to the filling material in Step 602. In this case, Step 606 can be omitted. Unwanted gas or air may be purged from the bonding material after step 606, generally as described for step 604.

A bonding material prepared generally according to the method of FIG. 6 may be in the form of a suspension or slurry, and may have a viscosity similar to that of prior art adhesives (e.g., epoxy adhesives). The resulting bonding material may then be applied to the bonding interface in a manner similar to that of applying conventional adhesives.

Figure 7A:
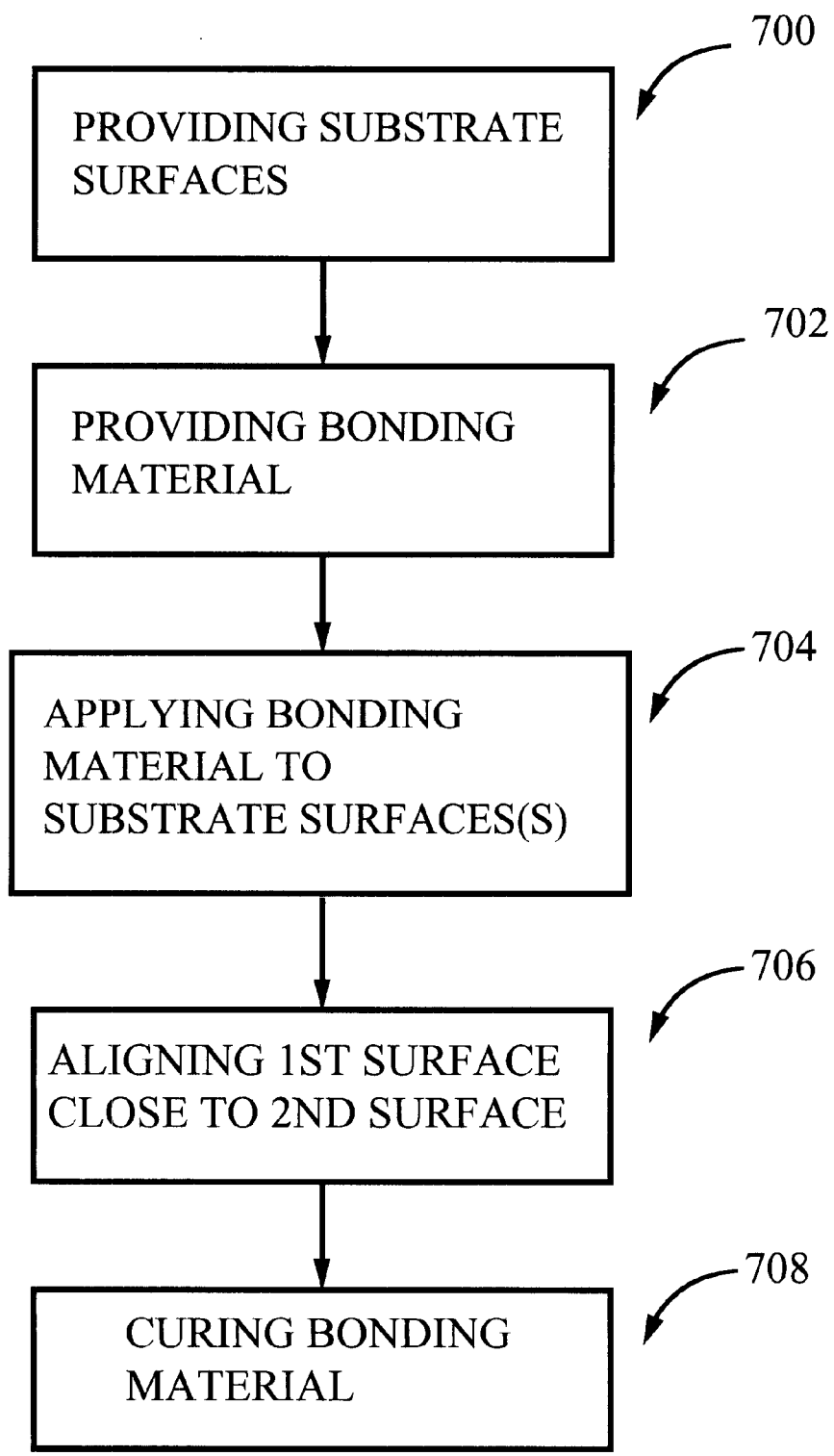
FIG. 7A schematically represents a series of steps involved in a method of bonding substrates, according to another embodiment of the invention.

FIG. 7A outlines a series of steps involved in a method of bonding substrate surfaces, according to another embodiment of the invention. Step 700 involves providing first and second substrate surfaces to be bonded. Step 702 involves providing a bonding material including a source of hydroxide ions. The bonding material provided in step 702 may further include a silicate materials (e.g., section B.3, supra), one or more filling material, and/or one or more property-modifying components (e.g., Component III, section B.3, supra). The one or more filling materials may include any of those materials listed hereinabove with reference to step 600 (FIG. 6).

Step 704 involves applying the bonding material to at least one of the first and second substrate surfaces to be bonded. In addition, a filling material and/or property-modifying material, such as is described above, may be applied to at least one of the first and second substrate surfaces prior to alignment of the first and second substrate surfaces in step 706 (hereinbelow). Step 706 involves aligning the first and second substrate surfaces close to each other such that the bonding material forms an interface between the first and second substrate surfaces.

The bonding material applied in step 704 may be cured in a further step 708 by any means that lowers the water content at the bonding interface, provided that the bonding performance is not compromised. Such means may include, without limitation:

a) heat treatment (e.g., using a conventional oven, a microwave oven), b) low pressure or partial vacuum treatment (e.g., using a vacuum oven in partial vacuum, either at ambient or elevated temperatures), c) desiccation (e.g., blowing dry gas, using a desiccator), and d) simply leaving the system to be cured under ambient conditions.

As a note of caution: microwave baking should only be used to speed up the curing process in situations where a)

microwaving does not create plasma from the bonding system, and b) microwaving does not create voids in the bonding material interface (e.g., due to a high water content thereof).

Figure 7B:
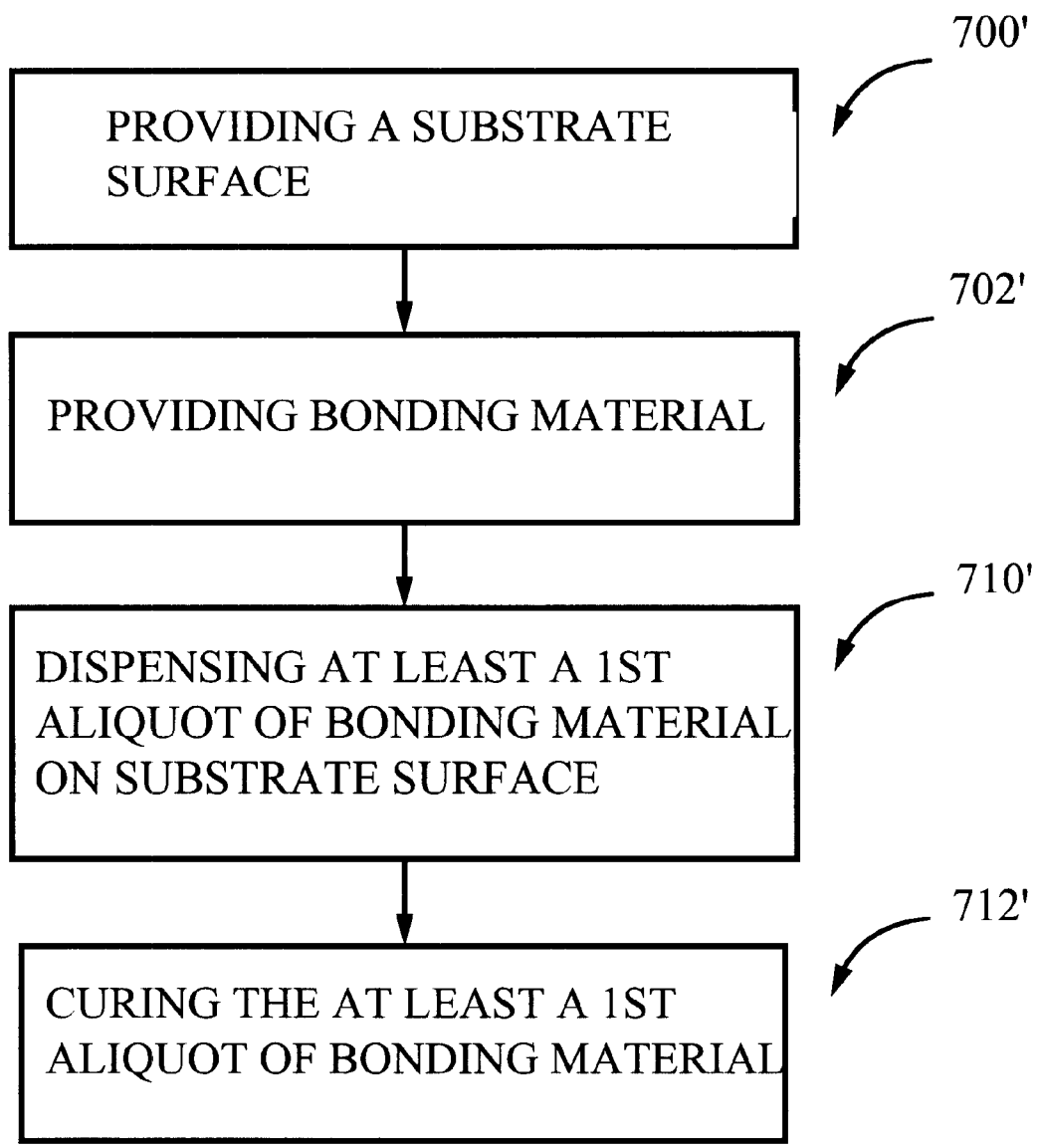
FIG. 7B schematically represents a series of steps involved in a method of applying a bonding material to a substrate, according to another embodiment of the invention.

FIG. 7B outlines a series of steps involved in a method of applying a bonding material to a substrate surface, according to another embodiment of the invention. Step 700' involves providing a substrate surface. The substrate surface provided in step 700' may be either bondable or non-bondable using bonding materials and methods of the invention, and either hydrophilic or hydrophobic.

Step 702' involves providing a bonding material, where the bonding material includes both a source of hydroxide ions and a silicate material. The bonding material provided in step 702' may additionally comprise a filling material and/or property-modifying component, such as was described hereinabove, e.g., with reference to Component III, section B.3, supra, and step 600 (FIG. 6). Thereafter, step 710' involves dispensing at least a first aliquot of bonding material on the substrate surface. The bonding material provided on the substrate surface may be poured, sprayed, spin-coated, pipetted, or otherwise dispensed on the substrate surface. The at least a first aliquot of bonding material may be cured, at least partially or to some extent, in step 712', generally as described with reference to step 708 (FIG. 7A).

A bonding material provided in step 702' may be in the form of a concentrated high pH aqueous solution of hydrated silicon dioxide and/or of certain silicate salts. When an aliquot of such an aqueous solution is dispensed on a surface, a droplet having convex curvature on its upper surface may be formed. Such an aliquot of bonding material may be cured to form a plano-convex lens. Such a lens may either be adhered to the substrate surface (provided that the substrate surface is bondable, or rendered bondable, according to the invention), or may be an individual or detached optical element (provided that the cured bonding material is detachable and detached from the surface). In the latter situation, the substrate surface serves as a plane mold. Similarly, lenses (or objects, in general) of other geometries may be formed by employing bondable substrates and/or detachable molds of corresponding geometry. According to the invention, materials (e.g., Teflon™M) that have no, or a low, surface population of hydroxyl groups may be chosen as surfaces or molds for easy detachability of the cured bonding material from the surface or mold. The surfaces of a lens (or other object) formed in this way may be chemically derivatized (e.g., rendered hydrophobic) by standard techniques well known in the art.

According to one embodiment of the invention, step 710' may include providing a plurality of aliquots of bonding material, in which case each of the plurality of aliquots may be sequentially cured, at least to some extent, prior to sequentially providing one or more further aliquots of bonding material. In this manner, bonding material may be built up step-wise to form a cured layer of bonding material having substantial thickness. A cured layer of bonding material of the invention, built up either as a single aliquot or in a step-wise manner, may be at least 1 cm in thickness.

Figure 7C:
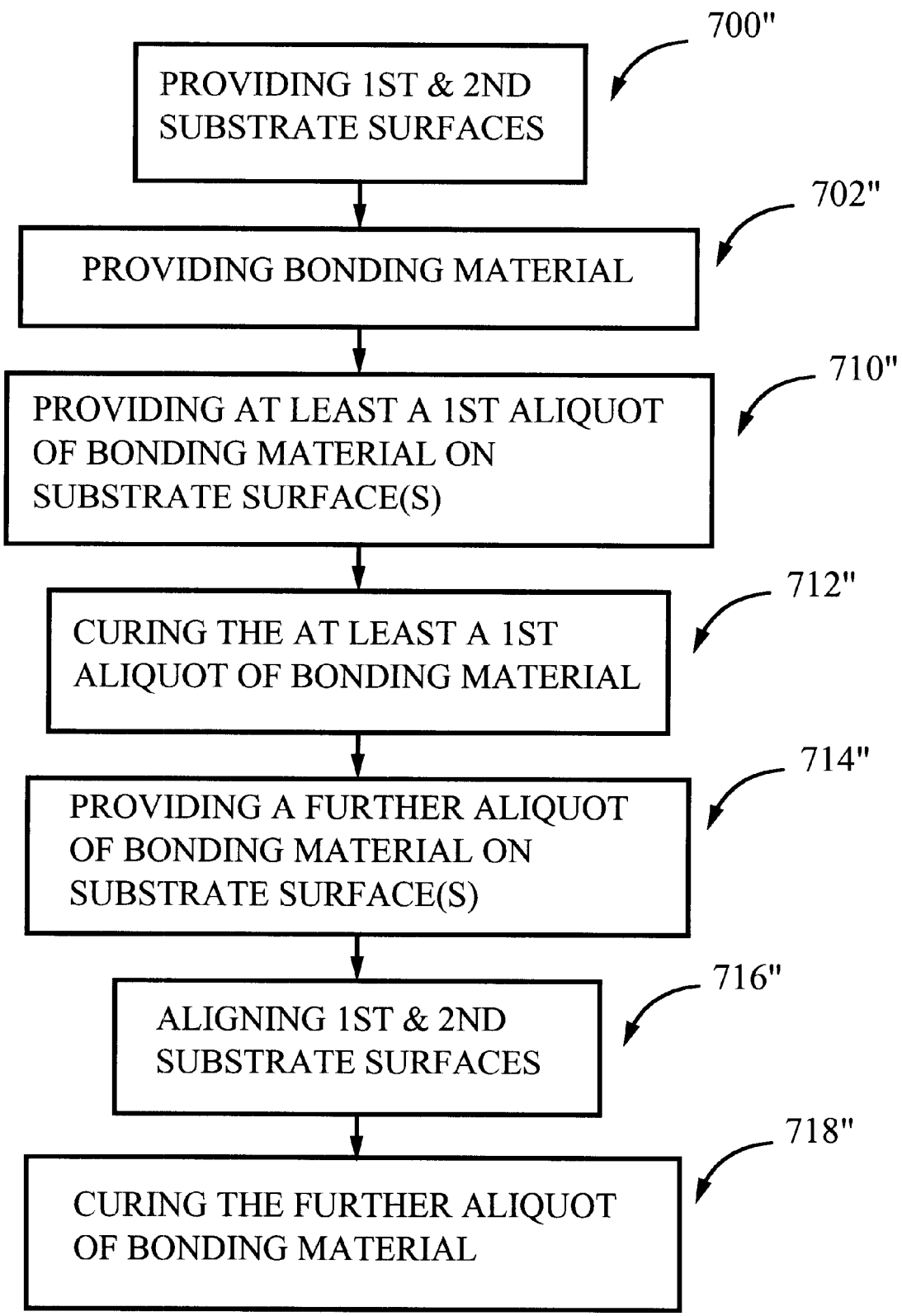
FIG. 7C schematically represents a series of steps involved in a method of bonding first and second substrates, according to another embodiment of the invention.

FIG. 7C schematically summarizes a series of steps involved in a method of bonding first and second substrates, according to another embodiment of the invention. Step 700" involves providing first and second substrate surfaces. Step 702" involves providing a bonding material including a source of hydroxide ions. The bonding material provided in step 702" may further include a silicate material, a filling material, and/or a property-modifying component, as described hereinabove.

Step 710" involves providing at least a first aliquot of bonding material on at least one of the first and second substrate surfaces. Step 712" involves curing, at least partially, the at least a first aliquot of bonding material to provide at least a first aliquot of cured or partially cured bonding material. Step 714" involves providing a further aliquot of bonding material on the at least a first aliquot of cured bonding material. Step 716" involves aligning the first and second substrate surfaces to form an interface of uncured bonding material. The interface of uncured bonding material may be cured in step 718".

Using the method described with reference to FIG. 7C, a bonding material interface of a desired composition and thickness may be obtained. According to one embodiment of the invention a layered or laminate interface may be produced by providing aliquots of bonding material having different compositions. Similarly, an interface having a gradient in the concentration of one or more bonding material components may be formed. In this way the properties of the bonding material interface may be fine-tuned for particular applications.

Depending on factors such as the composition of the bonding material, the curing conditions (e.g., the temperature regime), and bonding material thickness, the cured bonding material may be characterized by a certain degree of elasticity. Elasticity of cured bonding material, e.g., at a substrate interface, may be desirable for certain applications. For example, elasticity of cured bonding material can mitigate problems caused by the mismatch in thermal expansion between two dissimilar substrates being interfaced.

Figure 8:
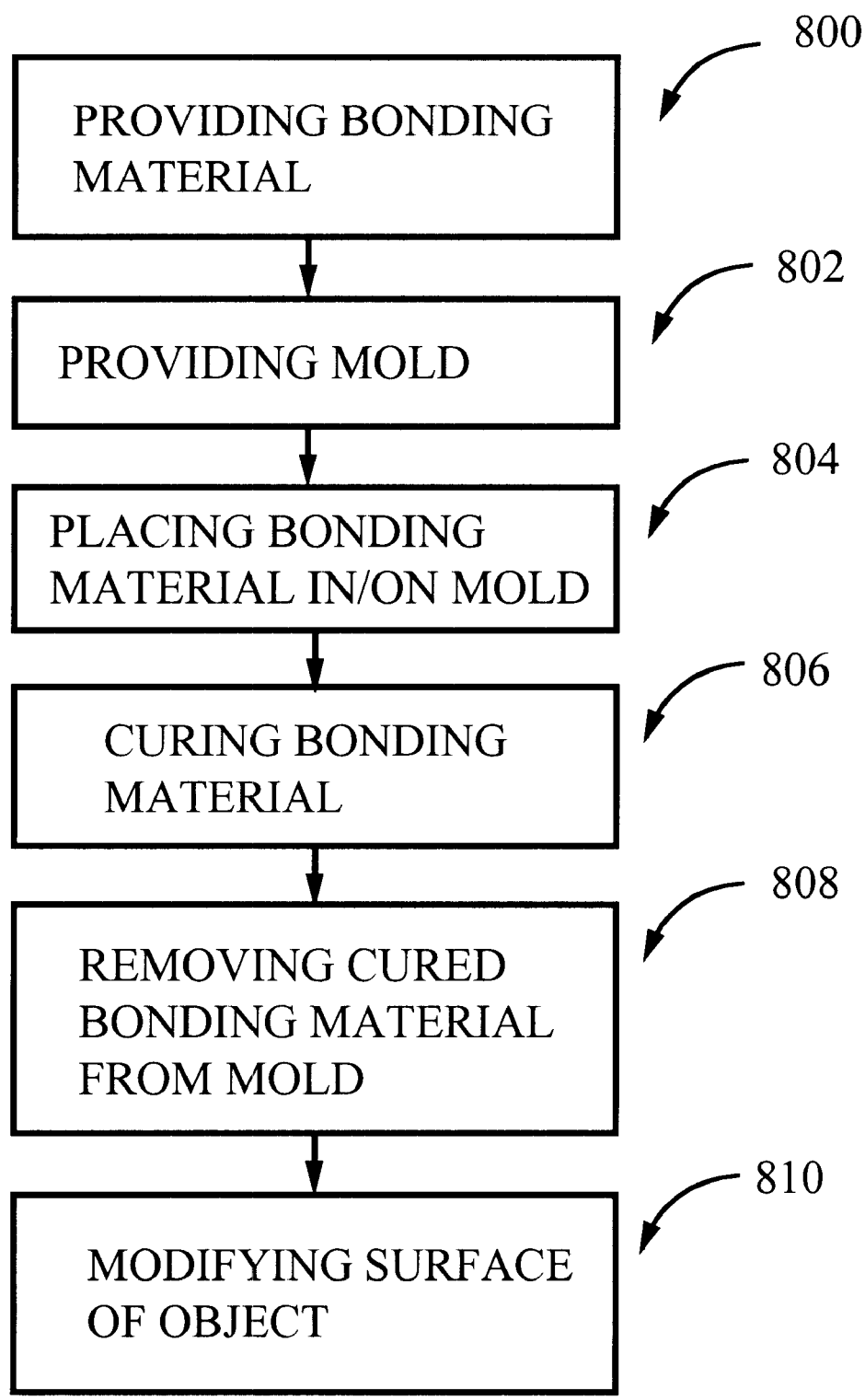
FIG. 8 schematically represents a series of steps involved in a method of forming an object having a defined geometry, according to another embodiment of the invention.

FIG. 8 schematically summarizes a series of steps involved in a method of forming an object having a particular geometry, according to another embodiment of the invention. Such an object may be bonded to one or more substrates, or may be an individual or detached object (i.e., not bonded to a substrate on which it was formed). Step 800 involves providing a bonding material, wherein the bonding material includes a source of hydroxide ions and silicate material, with or without a filling material, essentially as described hereinabove. The bonding material may further include one or more property-modifying components, also described hereinabove. The silicate material may be in the form of an alkaline aqueous solution of hydrated silicon dioxide, an alkaline aqueous solution of silicate salt(s), or may be provided from a silica-based, silicate-based, silica-containing, or silicate-containing component of a filling material. A filling material and/or property-modifying component of the bonding material of the invention may include particulate or non-particulate forms of materials such as those described hereinabove, e.g., with reference to Component III (section B.3, supra), or step 600, (FIG.6).

Step 802 involves providing a mold of the object to be formed. Such a mold may include one or more substrate surfaces each of which may be comprised of the same or a different substrate material. According to one embodiment of the invention, a mold may include one or more plane surfaces.

If the object to be formed is required to adhere to a particular substrate surface of the mold, that substrate surface should not only serve as a mold surface, but should also be bondable according to the invention. If the object to be formed is to be detached from a mold surface, then the corresponding mold surface preferably consists of a material which is not bondable according to the invention. Materials (e.g., Teflon™) that have no, or a low, surface population of hydroxyl groups may be chosen as mold materials, or mold covering materials, for easy detachability from the cured bonding material. According to one embodiment, the mold provided in step 802 includes Teflon™, e.g., as a Teflon™ outer layer. A mold provided in step 802 may have dimensions down to about 1 μm or less.

Step 804 involves placing the bonding material of step 800 in or on the mold of step 802. Prior to step 804, any unwanted gas(es) present in the bonding material may be removed or minimized. As an example, air bubbles, which would otherwise become trapped within the bonding material during the curing cycle, may be removed prior to step 804. Air bubbles or other gases may be purged from the bonding material by various techniques well known in the art.

Step 806 involves curing, at least partially, the bonding material to form the object. According to one embodiment of the invention, the bonding material provided in step 800 may be a concentrated, high pH alkaline aqueous solution of a base, such as NaOH, and silicon dioxide; or a concentrated high pH alkaline aqueous solution of certain silicate salts. For example, a bonding material may be formulated as an aqueous solution having about 2% to about 25% by weight of NaOH, and about 5% to about 40% by weight of silicon dioxide. A currently preferred bonding material according to certain embodiments of the invention comprises about 14% by weight of NaOH and about 27% by weight of silicon dioxide. Such a bonding material may be dispensed and cured to form transparent objects (i.e., transparent to at least certain wavelengths in at least one dimension) having particular geometries. For example, transparent sheets, layers, lenses, and optical windows of various dimensions and shapes (e.g., plane, convex, concave, plano-concave, plano-convex) may be formed. Such transparent objects may be variously colored and may have differential absorption over the ultra-violet, visible light, or infrared ranges. Using the method of the invention described herein with reference to FIG. 8, objects ranging in thickness from less than 1 micrometer to more than 1 cm may be prepared.

According to one embodiment of the invention, a transparent object may be formed between, and adhered to (e.g., bonded or mechanically fastened to), two other refractive optical elements (related by one optical path) wherein the other optical elements function as molds for the transparent object. For example, a triplet lens may be formed by sandwiching bonding material between a first lens and a second lens, wherein the bonding material is bonded to each lens and the bonding material itself functions as a refractive optical element. Similarly, a transparent object may be formed between a single refractive optical element and a detachable mold, such that the transparent object is adhered only to the single refractive optical element. In this way, optical loss due to Fresnel reflection at the surfaces of the optical elements is minimized.

According to one embodiment of the invention, a soluble or dispersible compound (e.g., a dye) may be added to the bonding material to control the transmission spectrum of optical windows or lenses formed by the bonding material. The term dye as used herein includes pigments and colorants which may be natural or synthetic. According to another embodiment of the invention, insoluble or partially soluble powders of an appropriate particle-size distribution may be added to the bonding material to control optical scattering loss of lenses or optical windows formed from the bonding material.

The curing step 806 may be performed under ambient conditions. Alternatively, depending on the particular application, the composition of the bonding material, and other factors, the curing process may be accelerated in various ways, generally as described with reference to step 708 (FIG. 7A). For example, the bonding material in the mold of step 802 may be cured by baking in a conventional or microwave oven. The curing step 806 may also be performed at temperatures below ambient, e.g., at about 0° C.

Optional step 808 involves removing the object from the mold. Of course, step 808 can be omitted, and an object formed from cured bonding material may remain adhered to a surface of the mold. Such a surface may be a plane surface. Optionally, depending on factors such as the application or intended use of the object, the object may be subjected to surface derivatization in step 810. Surface derivatization of the bonding material, or covering of the bonding material with a hydrophobic material to provide a hydrophobic surface layer may serve to prevent degradation of the object, e.g., due to reaction of the bonding material with atmospheric moisture. Surface modification and covering techniques are well known in the art.

Figure 9:
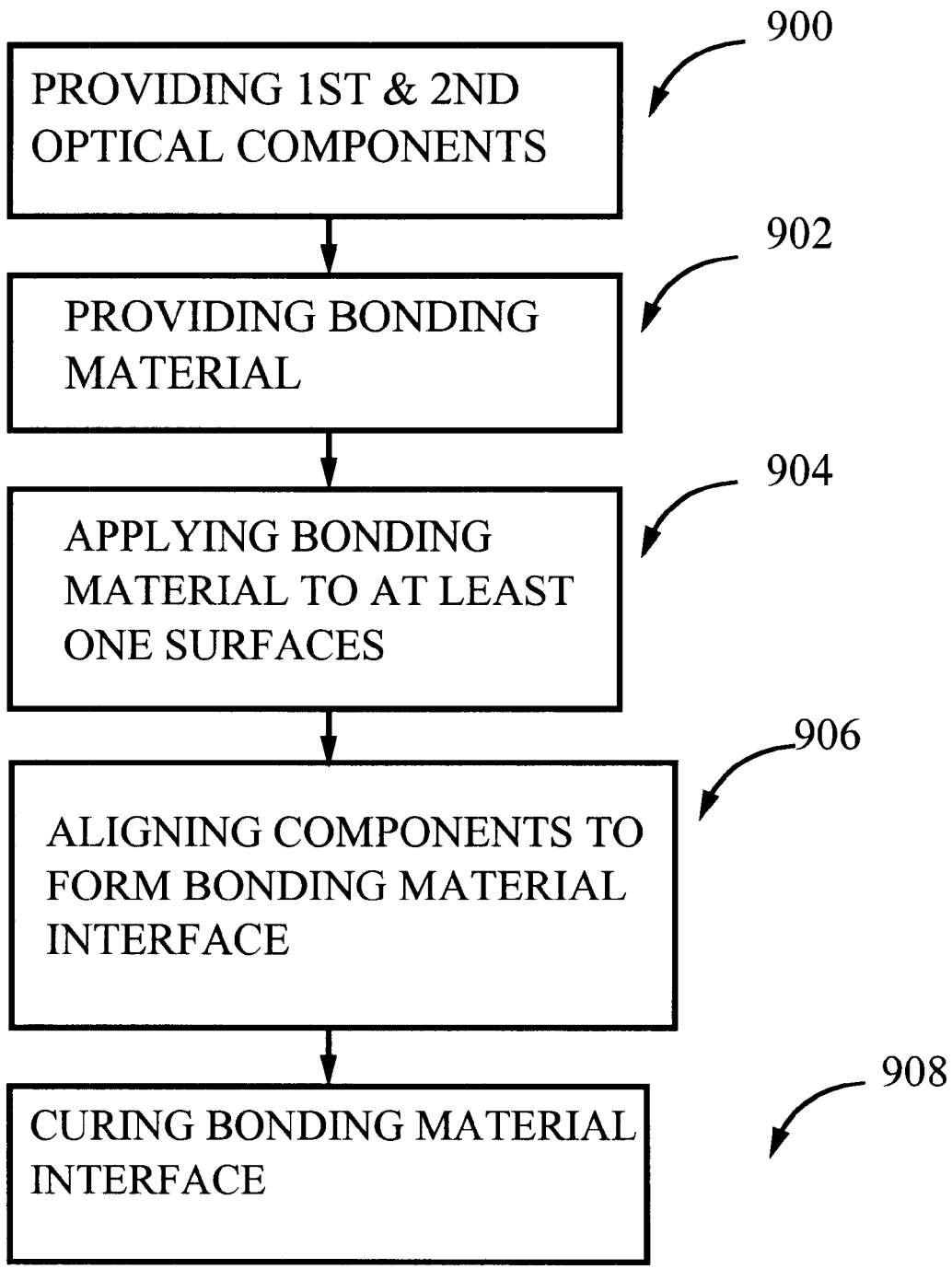
FIG. 9 schematically represents a series of steps involved in a method of assembling a system, according to another embodiment of the invention.

FIG. 9 schematically summarizes a series of steps involved in a method of assembling a system, e.g., an optical or optomechanical system, according to another embodiment of the invention. Step 900 involves providing first and second optical or optomechanical components having first and second surfaces to be bonded, respectively. Each of the first and second components provided in step 900 may be, for example, an optical flat, a lens, a window, an optical filter element, a waveplate, an optical fiber, a laser crystal, an optomechanical spacer, or a fixture. Alternative or additional optical or optomechanical components may be apparent to the skilled artisan, and are within the scope of the invention.

Step 902 involves providing a bonding material comprising water and a source of hydroxide ions. The bonding material may consist essentially of an aqueous solution, e.g., a solution of KOH or NaOH. A currently preferred bonding material for fused silica and/or fused quartz is an aqueous solution of NaOH or KOH with concentration in the range of from less than 1% to about 10% by weight. Alternatively, the bonding material may be in the form of an aqueous solution of hydrated silicon dioxide (or a silicate salt) and NaOH (or KOH). For example, the bonding material may be in the form of an aqueous solution or suspension of hydrated silicon dioxide with KOH or NaOH, the solution or suspension containing from about 2% to about 25% by weight of NaOH or KOH, and from about 5% to about 40% by weight of silicon dioxide.

Step 904 involves applying the bonding material to at least one of the first and second surfaces to be bonded. Step 906 involves aligning the first and second precision optical components to form a bonding material interface between the first and second surfaces. The bonding material interface formed in step 906 may have a thickness in the range of not more than 10 nm to about 1 cm. When the capillary effect is inadequate to hold sufficient bonding material to achieve good fill factor, a mold, or reservoir may be used to contain the bonding material.

One advantage of the assembly method of the invention is that the bonding material interface formed in step 906 may be very thin and transparent, at least to visible light and near infrared. As a result of the bonding method of the invention, optical loss of the optical assembly due to the bonding interface is extremely low. Step 908 involves curing the bonding material interface, generally according to the description of step 708 (FIG. 7A). The curing step 908 may be performed at ambient temperature or at a temperature above or below ambient temperature.

Figure 10:
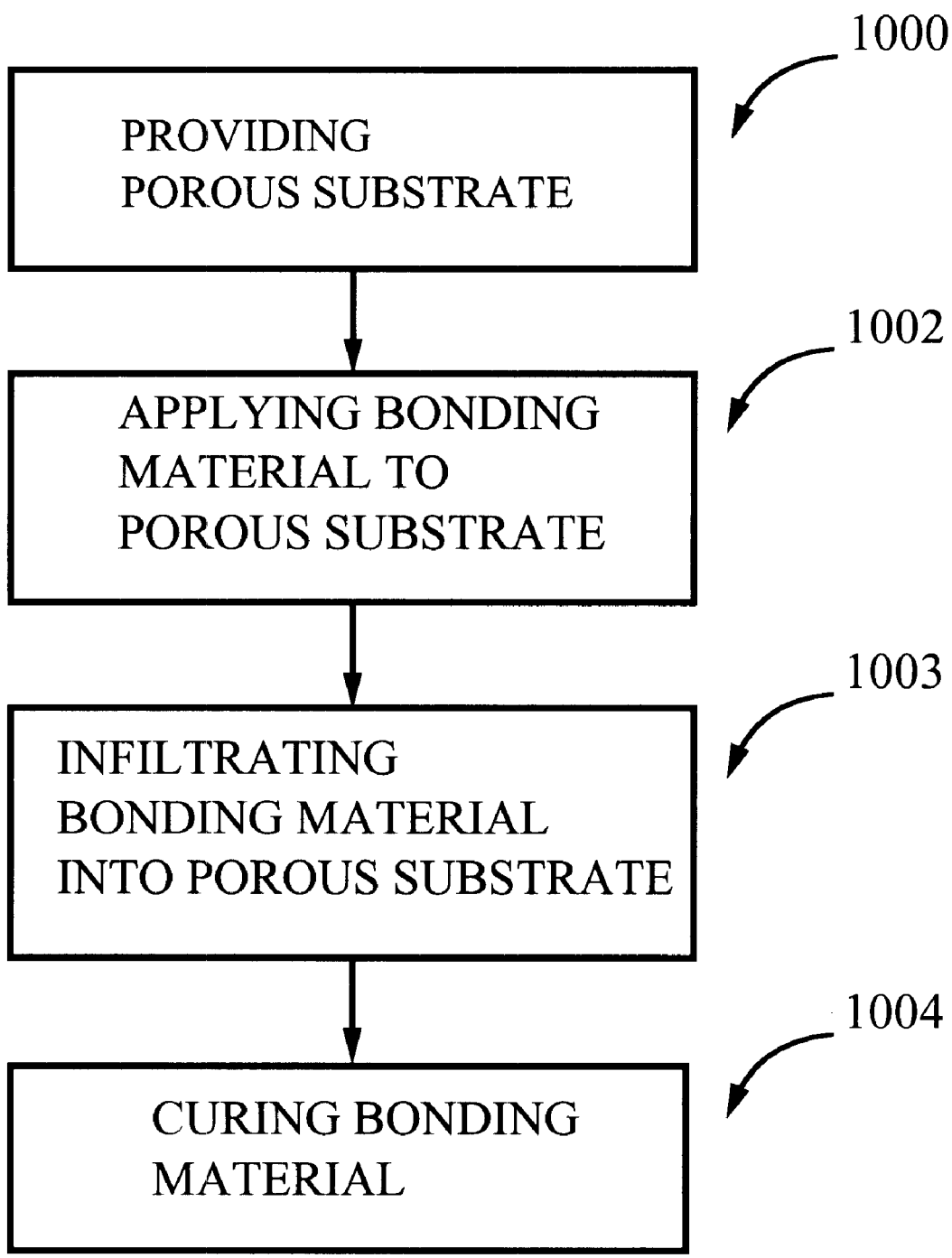
FIG. 10 schematically represents a series of steps involved in a method of forming a composite material, according to another embodiment of the invention.

FIG. 10 schematically represents a series of steps involved in a method of forming a composite material, according to another embodiment of the invention. Step 1000 involves providing at least one substrate material. According to a currently preferred embodiment, the substrate material provided in step 1000 is a porous substrate material having a plurality of voids therein.

A porous substrate material provided in step 1000 may have pores or voids of any shape which allow at least partial penetration of a liquid or slurry within at least one of the plurality of pores of the porous substrate. Similarly, the porous substrate material provided in step 1000 is not limited to naturally porous materials, such as sponge. Instead the porous substrate material may be any material which has been rendered porous by various treatments or production techniques, for example, various synthetic polymer foams, and fibrous or particulate forms of various metals or alloys (e.g., steel wool).

According to one embodiment of the invention, the porous substrate material is of unitary construction. The porous substrate material provided in step 1000 may have a defined shape. The porous substrate material may also have a certain amount of elasticity, and,have the potential to change its shape as well as to revert to its original shape after deformation.

According to one embodiment, a currently preferred porous substrate includes at least one material bondable according to the bonding technique of the invention. Any material bondable according to the invention may be prepared as a porous substrate, for example, by bonding a particulate or fibrous form of the material under low fill-factor conditions, or by fusing a particulate or fibrous form of the material (e.g., by application of heat). Fusing of fibrous or particulate materials to provide a porous substrate may performed before and/or after application of a bonding material (step 1002, infra) to the substrate material. Examples of materials bondable according to the invention are given in section B.1, supra.

Step 1002 involves applying a bonding material to the at least one porous substrate material. The bonding material may be any of the bonding materials described herein according to the instant invention. That is to say, the bonding material applied to the porous substrate includes at least a source of hydroxide ions, and may contain in addition one or more of the following components: a) a silicate material, b) a filling material, and c) a property-modifying component. The bonding material may be applied to the porous substrate by various techniques well known in the art, including spraying, immersion, etc.

Optional step 1004 involves infiltrating the bonding material into the pores or voids of at least one of the plurality of pores. Infiltration may be accomplished, for example, by the application of positive pressure from the exterior of the porous substrate, or by the application of a partial vacuum. According to one embodiment, application of the bonding material to the porous substrate and infiltration of the bonding material may be accomplished together, e.g., by immersing the porous substrate in the bonding material and applying a partial vacuum to the system. Other techniques for applying and/or infiltrating bonding material to/into a porous substrate are known in the art or will be apparent to the skilled artisan. Of course, in situations calling for a more or less superficial coating or layer of bonding material on the substrate, optional step 1004 may be omitted. Step 1006 involves curing the bonding material, generally as described hereinabove.

Figure 11:
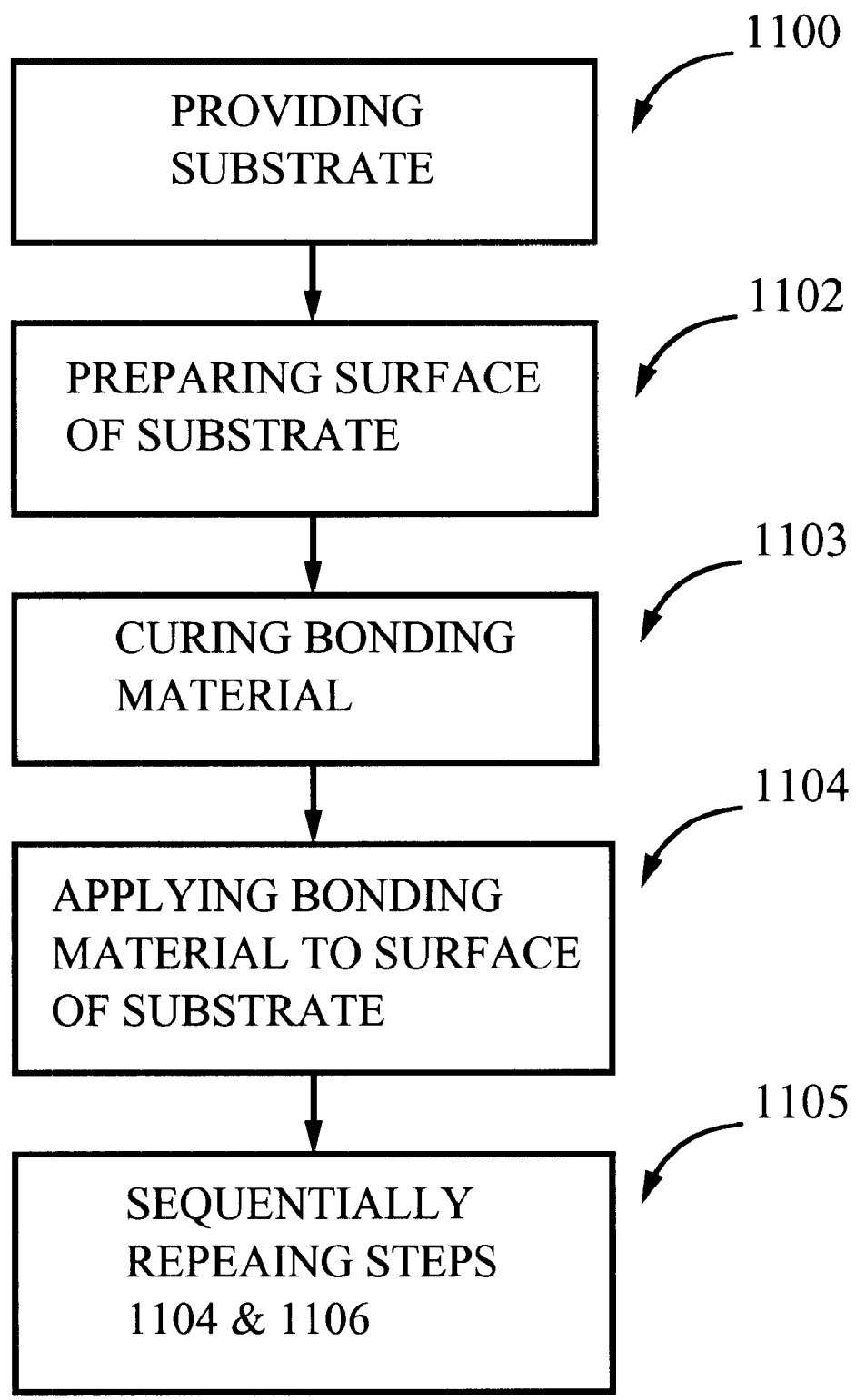
FIG. 11 schematically represents a series of steps involved in a method of coating a substrate with a hydroxide-ions-based bonding material, according to another embodiment of the invention.

FIG. 11 schematically represents a series of steps involved in a method of coating a substrate with a hydroxide-ions-based bonding material, according to another embodiment of the invention. Step 1100 involves providing a substrate to be coated with a bonding material of the invention. According to one embodiment, wherein a coating applied to the substrate is to remain attached to the substrate, the substrate to be coated preferably includes at least one material bondable by the bonding technique of the invention. Examples of such materials are given in section B.2, supra. Alternatively, in embodiments where a coating is to be detached from the substrate, at least one surface of the substrate is non-bondable, or can be treated to render it non-bondable, by the bonding technique of the invention.

Optional step 1102 involves preparing or treating at least one surface of the substrate to accept a bonding material. Examples of preparing at least one surface of the substrate include cleaning (e.g., to increase the efficiency of bonding to the surface) and hydrophobic derivatization (e.g., to prevent bonding of the bonding material to be applied to the treated surface). Examples of techniques for cleaning and derivatization of substrate surfaces are described hereinabove. Other techniques for surface preparation are well known in the art. Depending on the intended application of the coating method, the nature of the substrate, and other factors, step 1102 can be omitted.

Step 1104 involves applying a first coating of bonding material to at least one surface of the substrate. The bonding material may be applied to the substrate using techniques well known in the art, such as spraying, spin-coating, etc. The bonding material may be applied to the entire area of the at least one surface either uniformly or non-uniformly, or may be applied selectively only to.certain areas of the at least one surface.

The bonding material applied to the substrate in step 1104 may be any of the bonding materials described herein according to the instant invention. Thus, the bonding material may include a property-modifying component. As an example, the bonding material may include a dye or pigment. The bonding material applied to at least one surface of the substrate may be transparent (in at least one dimension), translucent, or opaque. Such a transparent coat of a bonding material applied to a substrate may be modified to exhibit specific colors or absorption characteristics.

Step 1106 involves curing the bonding material applied to the substrate to provide a coating of at least partially cured bonding material on at least one surface of the substrate. The coating of cured bonding material may have various thicknesses, ranging from less than 1 nm to 1 cm. Such a coating of bonding material may serve a protective function to the underlying substrate, and/or may impart novel physical or chemical properties to the coated substrate.

Optionally, step 1108 involves sequentially repeating the steps of applying bonding material (step 1104) and curing the applied bonding material (step 1106). Thus, after curing the bonding material according to step 1106, one or more additional coatings of bonding material may be sequentially applied to an existing or first coating of bonding material, and the one or more additional coatings of bonding material sequentially cured. Each of the first coating and the one or more additional coatings of bonding material may have the same, or a different, composition. In this way a multi-layered coating structure (either homo- or hetero-laminate) can be fabricated on the substrate. Such multi-layered coating structures may find applications in fabrication of various electronic or optoelectronic devices. After curing, single or multi-layered coats of bonding material may be detached from, or remain attached to, the substrate depending on the intended function or application of the coating of bonding material.

C.1 Properties & Advantages

Bonding methods of the present invention are superior in many respects to the prior art methods of optical contacting, epoxy bonding, and high-temperature frit bonding. The bonding processes of the invention have essentially all of the advantages of these common approaches while avoiding almost all of their drawbacks and disadvantages.

As an example, hydroxide-catalyzed bonding of silica (such as, fused silica and fused quartz) has the following primary advantages:

(1) High Mechanical Shear Strength Mechanical shearing-strength tests performed on hydroxide-catalyzed precision bonded fused-silica samples always resulted in tearing the bulk materials as well as the bonded interface. This demonstrates that the mechanical strength of the hydroxide-catalyzed precision bond is similar to the strength of fused silica. As an example, using an aqueous solution of KOH with a $KOH:H_2O$ molar ratio of 1:500 as bonding material, the measured nominal shear strength of the precision bonded fused silica substrates was more than 30 MPa (ca. 4000 psi). (The shear strength value is nominal because it does not correspond to a clean cleavage along the original bonding interface.)

(2) High Reliability Bonding methods of the invention are not only less demanding with respect to surface chemical cleanliness requirements, but also provide more reliable, consistent, and reproducible results, as compared with optical contacting, as measured by almost all aspects of bonding, including bonding coverage, strength, and success rate.

(3) Tolerance of Temperature Extremes Hydroxide-catalyzed bonding of the invention can tolerate a wide range of temperatures, spanning at least from 2 Kelvin (K) up to 423 K (ca. 150° C.) (the highest temperature tested). Samples bonded according to the invention, (ranging in size from about 1 mm up to about 20 cm and having various substrate geometries and interface dimensions) also survived 20 K/minute average cool-down rate from room temperature to 77 K, and 100 K/hour average cool-down rate from room temperature to near liquid-helium temperature. Because fused silica has low thermal conductivity, these average cool-down rates, which were measured at substrate surfaces, result in huge thermal stress inside the substrates being tested. Moreover, samples bonded according to the invention even survived thermal shocks created by dropping them directly into liquid nitrogen or liquid helium from an ambient (room-temperature) environment.

(4) Room Temperature Process Bonding methods of the invention may be performed at room temperature, thereby avoiding negative side effects and high costs associated with high temperature treatments. Such negative side effects may include intolerable mechanical stress and strain, and/or optical distortion of the bonded system.

5) Low Cost Process Hydroxide-catalyzed bonding according to the invention provides a low cost process, and has an extremely high first-try success rate in both precision and non-precision applications. The hydroxide-catalyzed bonding technique of the invention may be performed at very low cost. This is due to a number of factors, including: a) availability of inexpensive bonding materials, b) the technique is characterized by an extremely high first-try success rate, and c) the process may be performed at room-temperature (side effects due to high temperature treatments add to the overall cost). Methods of the invention thus enjoy the advantages of low cost and superior bonding performance, as compared with many prior art bonding processes.

As an example of the success rate and effectiveness of the invention, the cryogenic Gravity Probe B (GP-B) science instrument involves nearly fifty ultra-precision bonds performed according to the invention. (See, for example, D. H. Gwo, SPIE Vol. 3435, Cryogenic Optical Systems and Instruments VIII, 136 (1998); D. H. Gwo, SPIE Vol. 3356 Space Telescope and Instruments V, 892 (1998).) Each of these bonds passed the stringent performance and alignment precision requirements of the GP-B project. (The budget and extremely tight schedule of the GP-B project did not allow any errors in the bonding work referred to above.)

(6) Adjustable Settling Time The settling time and the bonding reversibility of the bonding process of the invention are adjustable through appropriate selection of the bonding material composition and the method of dispensing the bonding material. As an example, the length of the settling time in precision bonding of fused silica substrates can be varied from a few tens of seconds to about 40 minutes. In case of failure, such as misalignment, the bonding surfaces may be separated before the settling time expires and recovered for re-bonding. (In contrast, optical contacting has essentially zero settling time, and the bonding surfaces are usually not recoverable to achieve better bonding coverage than was originally obtained.)

(7) Broad Range of Interface Thickness The interface thickness of hydroxide-catalyzed bonding of the invention can be made less than 10 nm for precision applications, and can be made as much as about 1 cm or more for non-precision applications.

(8) Absence of Optical/Mechanical Distortion A hydroxide-catalyzed precision bonding interface between fused silica and/or fused quartz substrates creates no detectable optical and/or mechanical distortion over a temperature range from room temperature to near liquid-helium temperatures, as verified by Fizeau interferometry on samples having various geometries and interface dimensions.

(9) Transparent Bonding Interface Bonding materials and methods of the invention provide bonding interfaces which are transparent in at least the visible and near-infrared range. For example, the optical loss (at a wavelength of 1.06 $\mu$m) due to scattering and/or absorption at the precision bonding interface is undetectable using state-of-the-art laser measurements. (In contrast, Corning's frit bonding of the prior art gives an opaque interface.) Since the cured bonding material has a refractive index close to that of regular-glass, optical-index matching is basically not an issue, particularly in precision-bonding of regular glass substrates having good surface figure match.

(10) UV-Insensitivity Inorganic-based bonding materials of the invention are generally insensitive to UV photolysis. (In contrast, certain organic-based optical epoxies may be weakened or even blackened upon exposure to UV radiation.)

(11) High Damage Threshold At a wavelength of 1.06 micrometer, the damage threshold at an interface created by precision bonding according to the invention ranges from about 3 to about 30 $J/cm^2$ in fluence, which corresponds to approximately 1 to 10 Giga-Watt/$cm^2$. (In the absence of surface defects and/or contaminants at the interface prior to bonding, the interface damage threshold may be even higher than the cited values.)

(12) Longevity Hydroxide-catalyzed bonding shows no degradation in strength and optical quality during accelerated life tests corresponding to over ten years of aging. Life and accelerated-life tests were conducted under various conditions, such as, in a normal (ambient) laboratory environment, in water, in a desiccated environment, or at elevated temperatures.

(13) Negligible Outgassing Hydroxide-catalyzed bonding has negligibly small outgassing for ultra-high vacuum applications. Furthermore, the only outgassing species is water molecules, as identified by state-of-the-art mass spectroscopy. Bonding methods of the invention were successfully used in the Gravity Probe B project's ultra-high-vacuum (ca. $10^{-11}$ Torr) system.

(14) Negligible Magnetic Contamination Hydroxide-catalyzed bonding shows negligibly small magnetic contamination, even in perhaps the most magnetic-sensitive applications, such as Gravity Probe B.

(15) Water Resistance Hydroxide-catalyzed bonding is water resistant, and thus robust in humid or underwater environments. This is so even without post-curing treatment to enhance hydrophobicity, provided that the edge of the bonding interface is relatively thin (e.g., <about 200 nm). After immersion in water for two years, none of the samples tested showed any sign of degradation in bonding performance.

(16) Chemically Inert Hydroxide-catalyzed bonding having a thin interface edge (e.g., <about 200 nm) is essentially chemically inert, even without post-curing treatment to enhance chemical resistance. Bonding material at the edge of the interface can withstand exposure to a wide pH range, at least from aqua regia (for >1 hour) to pH 13 (for >215 hours). Further, various organic solvents have no impact on the bonding quality of samples having a thin interface edge.

(17) Mechanical Damping Hydroxide-catalyzed bonding according to the invention has helped create fused-silica systems having mechanical Q values ranging from about 1 to about $10^6$, corresponding to a wide range of mechanical damping characteristics. In general, the lower the viscosity of the bonding material, the higher the resulting Q value.

C.2 Applications

There are many demonstrated and potential applications for bonding methods according to the present invention, some of which will now be described.

(1') Bonding of a Wide Variety of Materials

Bonding methods of the instant invention can be used to bond a wide variety of materials (including metals, alloys, semiconductors, superconductors, metal oxides, glass materials, ceramic materials, certain polymers (plastics, rubbers), etc., as exemplified in Subsections B.1 and B.2), supra. Moreover, various forms of such materials are bondable according to the invention (e.g., either crystalline or amorphous, solid substrates or foam structures, polished or unpolished, etc.).

(2') General Optical Applications

A bonding interface formed according to the invention may have the following characteristics:

a) transparent in at least the visible and near-infrared range, b) having an optical index close to that of a regular glass, c) extremely thin in dimension, d) fairly thick in dimension, e) insensitive to ultraviolet-induced photolysis, and f) insensitive to optical/thermal loading in terms of pyrolysis.

Characteristics a) and c) suggest that an extremely thin precision-bonded interface is effectively transparent also in other spectral ranges other than the visible and near-infrared range. Characteristic c) implies that wavefront distortion due to the interface bonding material may be minimized. Characteristics b)-d) indicate the capability of the bonding material to bridge gaps between optical elements to minimize optical loss due to Fresnel reflections. Characteristic e) suggests the suitability of bonding materials and methods of the invention for use in certain UV optics and UV environments. Characteristic f) explains the applicability of the bonding technique to systems involving extremely high optical power densities.

As a higher-performance substitute for many prior art bonding processes, hydroxide-catalyzed bonding methods of the invention are readily applicable to fabricating various optical and/or optomechanical assemblies (e.g., doublet lens, triplet lens, waveplate/plano-convex lens assemblies, and Fabry-Perot resonance cavities), and systems (e.g., nearly fused-quartz-only GP-B telescopes, laser ring gyroscopes). One potentially important area of application is in assembling infrared, or X-ray, optics involving silicon components.

(3') Applications Involving High Optical-power Density (e.g., Due to Lasers)

Because the bonding interface according to the invention consists of only inorganic materials that cannot be easily oxidized or pyrolyzed by high-power heat dissipation, application of hydroxide-catalyzed bonding methods in fabricating optical (refractive, transmissive, or diffractive) and/or optomechanical assemblies or systems may provide extremely high damage threshold in terms of power density. Typical examples of such applications which have been demonstrated include bonding laser crystals, and fabricating laser optics (e.g., doublet lenses, triplet lenses, output coupler optics, gas-laser tube assemblies, and optical resonators). Heretofore, such component lenses have been bonded together by UV-cured synthetic polyester or other organic-based index-matching epoxies, which are usually problematic.

Combining small laser crystals (for example, the largest available from crystal growth) into a larger active laser medium may maximize the corresponding laser output power. Hydroxide-catalyzed precision bonding methods of the invention may serve as an excellent approach for this application for at least two reasons: a) negligible wavefront distortion occurs at the precision-bonded interface, and b) high mechanical tolerance is provided against thermal loading caused by high optical power density. Other optical crystals, or materials in general, may be combined similarly for similar reasons.

In addition to undoped laser host crystals (e.g., undoped calcite ($CaCO_3$), sapphire ($Al_2O_3$), Yttrium Aluminum Garnet (YAG, $Y_3Al_5O_{12}$)), doped laser crystals (e.g., Neodymium:YAG and Ytterbium:YAG) may also be bonded according to methods of the instant invention.

Examples of laser crystals that can be bonded by bonding methods of the invention include, without limitation:

$Ca_2Al_2SiO_7$ $Gd_3Sc_2Al_3O_{12}$ $Y_3Sc_2Al_3O_2$ $CaY_4(SiO_4)_3O$ $Be_3Al_2Si_6O_{18}$ $Y_{3-X}Yb_X Al_5O_{12}$ $Nd_X Y_{1-X} Al_3(BO_3)_4$ $La_{1-X} Nd_X MgAl_{11}O_{19}$ $Sr_X Nd_X Mg_X Al_{12-X} O_{19}$ $YAlO_3$ $BeAl_2O_4$ $Mg_2SiO_4$ $Y_3Fe_5O_{12}$ $LU_3Al_5O_{12}$ $Al_2O_3$ $CaCO_3$ (calcite)

It is likely that most other oxide-based crystals can be included in the above list. Generally, doped and/or undoped crystals can be bonded in either a homo- or hetero-configuration.

(4') Classical Precision Applications

As described hereinabove, hydroxide-catalyzed precision bonding performed according to the invention may provide a bonding interface which is extremely thin in dimension, and thus thin also in terms of optical path length, electric conductivity, and thermal conductivity.

Interface wedging associated with such a thin interface generally causes no alignment problem, including alignment instability, for most precision applications. As demonstrated by the Gravity Probe B (GP-B) Space Telescope, all precision-bonding interfaces have wedging well below 0.1 arc-second per cm of interface dimension, mostly limited by particulate contamination and surface figure mismatch, and not intrinsically limited by bonding methods of the invention. As exemplified also by GP-B, during the cool-down process to cryogenic temperatures, the alignment precision and stability of systems precision-bonded and formed according to the invention remain essentially unchanged from their alignment precision and stability at room temperature.

Settling time according to the invention is typically long enough for ultra-precision alignment, as demonstrated in the assembly work performed for the GP-B project.

The precision stability of the hydroxide-catalyzed precision bonding is certainly sufficient for splicing single-mode optical fibers, or fabricating X-ray micro-lithography masks.

(5') Fabrication of Miniature Structures & Devices

As described hereinabove, hydroxide-catalyzed bonding methods of the invention may provide, in a controlled manner, a bonding interface having a defined thickness (down to less than 10 nm), as well as certain physical and chemical properties. Bonding methods of the invention can thus be applied to a) fabricate miniature structures and devices having a wide variety of component materials, and b) couple miniature structures/devices with relatively large systems for various optical, mechanical, thermal, acoustic, and electronic applications. (Corresponding macroscopic applications will be apparent to those skilled in the art.)

According to one embodiment of the invention, a layered structure having superconductor-insulator-superconductor layers may be fabricated, in which the middle electrically insulating layer includes or consists of a precision-bonding interface between two superconductor layers. The thickness and electrical conductivity of the bonding material in such a system may thus be tailored according to the invention so that the system exhibits electron quantum-tunneling effects. Of course, layered structures involving other types of materials (e.g., semiconductors and metals) may also be fabricated similarly to create other electronic effects.

According to another embodiment of the invention, two superconductor thin-films may be brought into tight face-to-face contact by performing hydroxide-catalyzed bonding at locations other than the superconductor-superconductor contact area, such as directly between substrates supporting the superconductor thin-films. This approach serves as a mechanism for electrical connection of superconductor elements (e.g., wires), wherein the superconductor elements are terminated at each end as an extended thin-film supported by a substrate bondable according to the present invention.

Of course, hydroxide-catalyzed bonding methods of the invention may be applied in assembly or fabrication of numerous other devices such as, accelerometers, acoustic sensors (e.g., microphones), calorimeters, chemical sensors, pressure sensors, thermometers, etc.

(6') High Mechanical-strength Applications

The shear strength of the bonding provided according to the present invention may reach several thousand psi. The actual shear strength depends on the substrate material(s), surface figure match, and other factors such as cleanliness of the surfaces to be bonded.

The fused-quartz Gravity Probe B (GP-B) science instrument, assembled by a precision-bonding method according to the invention, passed NASA's stringent vibrational testing designed for space vehicle launching qualification, with an extremely high safety margin.

(7') Extremely Low Thermal-noise Applications

Precision bonding created by methods of the invention can meet perhaps the most stringent requirements on low thermal noise for many ultra-precision applications. As an example, for many ground-based laser-interferometric gravity-wave observatories around the world (e.g., GEO-600 in the United Kingdom) hydroxide-catalyzed bonding according to the invention has been the best, or one of the best, choices for interfacing large mirror substrates with their individual fiber-suspension systems. In addition to meeting the stringent requirement on mechanical strength, the bonding created according to the invention also results in the lowest ever recorded thermal noise, as indicated by measurement of the mechanical Q value of the resulting fibers/mirror system. The thermal noise of the bonding is essentially beyond detection by state-of-the-art techniques. (See, e.g., S. Rowan, et al, Physics Letters A, 246, 471, (1998); S. M. Twyford, et al, Proc. 2nd E. Amaldi Conference on Gravitational Waves, Geneva, Jul. 1–4 1997, Pub. by World Scientific.)

(8') Applications Demanding Specific Mechanical Damping or Q Values

Mechanical systems have been created, using bonding methods of the invention, to have mechanical Q values ranging from about 1 to about $10^6$. Bonding methods of the invention may provide mechanical-damping tuneability to the bonded system by appropriate selection of the bonding material composition. Typically, for precision bonding of substrates having excellent surface figure match, higher Q values are provided by more diluted or less viscous bonding materials.

(9') Applications in Space

Space applications of bonding methods of the invention were demonstrated by the rigorous testing program designed for the Stanford/NASA Gravity Probe B Relativity Mission. This testing program alone has demonstrated the capability of bonding methods of the invention, with respect to tolerance to launch load, cosmic rays, etc., for nearly all other space applications.

(10') Applications in Cryogenic and High Thermal Stress Environments

As described hereinabove, precision bonding between alike materials according to the present invention can withstand high thermal stress and cryogenic environments, as exemplified by the fused-quartz science instrument of Stanford/NASA Gravity Probe B, which has been qualified for 2.5-K operation.

Bonding between dissimilar materials according to the present invention is generally expected to survive a higher thermal stress and a wider temperature range as compared with prior art bonding techniques. One of the reasons for this effect is that the bonding material at the interface may be rendered somewhat elastic, thereby alleviating problems due to mismatch in the coefficient of thermal expansion (CTE)

between the dissimilar materials. This is particularly true for non-precision bonding between dissimilar substrates having poor surface figure match, in which the bonding interface is thicker, thereby providing more flexibility to attenuate mechanical stress due to CTE mismatch.

Preliminary performance testing for some other space science missions also indicate excellent feasibility of methods of the invention in terms of nearly perfect cryogenic reliability and other performance requirements.

One specific potential application of bonding according to the invention is assembly of precision X-ray optics assemblies and systems, which need to tolerate steep temperature gradients when used in a synchrotron radiation beam line.

(11') Underwater Applications

As described hereinabove, provided the edge of a bonding interface created according to the invention is sufficiently thin, the bonding becomes resistant to aqueous solutions within a wide range of pH values. In this case, no post-curing treatment is needed to further enhance hydrophobicity. Hermetic sealing against water was demonstrated by such bonds. When the periphery of the bonding interface is relatively wide, water resistance and pH tolerance may be enhanced by appropriate post-curing surface derivatization and/or covering (e.g., with a hydrophobic material).

(12') Applications in Chemistry and Chemical Engineering

The hydroxide-catalyzed bonding of the invention is essentially chemically inert, at least at room temperature, provided that the edge of the bonding interface is sufficiently thin. Such inertness may hold in many cases even without post-curing treatment to further enhance chemical resistance. At least at room temperature, such thin bonds can not only resist an extremely wide pH range, but also resist all common organic solvents tested. Thus, bonds created according to the invention can resist a wide variety of polar, non-polar, protic, and aprotic organic solvents. Hermetic sealing created by methods of the invention was demonstrated for all organic solvents tested. Therefore, bonding methods of the invention can be employed to fabricate transfer systems and containers for various gases and fluids, and may find use in a broad range of applications in chemistry and chemical engineering.

However, the more exposed the bonding material, or the thicker the edge of the interface, the more sensitive it is to chemical environments. In that case, appropriate post-curing treatments of exposed bonding material, such as surface derivatization and/or covering, can effectively increase-its chemical resistance.

(13') Adhesion Enhancement for Coatings and Lubricants

According to another embodiment, hydroxide-catalyzed bonding methods of the invention can be used for surface derivatization of a substrate, or to modify adhesion of a material to a substrate surface. Materials whose adhesion to a substrate may be modified according to the invention include various coatings and relatively viscous materials (e.g., lubricants). As an example, surface derivatization may be performed as follows. A substrate surface having a relatively low surface population of hydroxyl groups, may first be coated, by chemically bonding thereto a thin layer of silicate-like network (having a high surface population of hydroxyl groups). The silicate-like network may then be subjected to further surface derivatization, for example, to enhance surface hydrophobicity. The resulting surface hydrophobicity may greatly exceed that obtainable by direct derivatization of the original substrate surface. Such a derivatized surface is more-amenable to mechanical protection by lubricants.

(14') Vacuum Applications

When cured, bonding materials of the invention are normally compatible with ultra-high vacuum environments in terms of outgassing rate and species, as exemplified by the NASA/Stanford Gravity Probe B science instrument. This instrument incorporates approximately 50 underivatized and uncovered precision bonds created according to the invention. Precision bonding of the invention may result in vacuum-tight hermetic sealing. Bonding methods of the invention may therefore be employed for fabrication of vacuum components (e.g., feed-throughs), assemblies, and systems. In the event that water outgassing associated with bonding methods of the invention presents a problem, appropriate post-curing surface derivatization and/or covering may be performed.

(15') Applications in Jewelry

Bonding methods of the invention can be employed to combine precious and/or semi-precious stones together, either in homo-crystalline or hetero-crystalline configurations, to create various geometries as well as optical effects. Materials amenable to these applications nonexclusively include sapphire, quartz, zirconia, and any silica-based materials, such as opal, various jades, etc. In situations where surface figure match around the edge of the bonding interface is poor, appropriate post-curing surface derivatization or covering may help improve durability.

(16') Bio-compatible and Food Industry Applications

Provided that the edge of the bonding interface formed by bonding processes of the invention is sufficiently thin, the cured bonding interface is chemically inert and resistant to water and various consumable liquids/fluids (e.g., vegetable oils, wine, vinegar). Water-soluble hydroxide catalyst exposed around the interface edge from the bonding and curing process can be readily removed by rinsing with water. In other words, bonding methods of the invention are in principle safe and compatible with many biological, medical, and food industry applications. For example, the bonding process of the invention may-be used in manufacturing medical equipment, kitchen utensils, food containers, etc.

(17') Non-precision Applications

According to one embodiment of the invention, a bonding material which is relatively viscous or includes a filling material (i.e., ingredient(s) having a high fill factor) such as sand, powdered silica, or powdered silica-containing materials, may be used in the bonding technique of the invention for non-precision applications. Such bonding materials may be used as general purpose adhesives, especially when the materials to be bonded either have, or can be hydrated to create, sufficient surface hydroxyl group density.

(18') Molding Applications

According to one embodiment, bonding materials and methods according to the invention may be used in conjunction with a template or mold to provide a molding process for preparing a wide variety of objects; the objects having specified compositions as determined by the composition of a bonding material, and having particular geometries as determined by the template or mold. Particularly for larger objects to be molded according to the invention, the bonding material preferably includes a filling material. In practice, various molding techniques may include measures taken to prevent air from being trapped in the bonding material.

(19') Glass Repairing

Since bonding materials of the invention can be built up to a thickness of approximately 1 cm or more, bonding materials and methods of the invention can be used for glass repairing, e.g., to recover optical transparency of a cracked or chipped automobile windshield. To improve the surface flatness, smoothness, and/or transparency of glass repaired according to the invention, bonding materials of the invention are amenable to various polishing techniques. Further, to improve durability, hydrophobic derivatization may be readily applied.

(20') Manufacture of Novel Composites/Aggregates

According to another embodiment of the invention, bonding processes and bonding materials, with or without a filling material component, may be used to selectively or non-selectively fill gaps or pores in various porous substrate materials, to provide novel composites having new and useful physical properties. Many porous substrate materials are candidates for use in conjunction with this embodiment of the invention, including various synthetic foams (e.g., polyurethane foams), SXA foam, Stablcell™, sponges, fibrous metal substrates, etc. Filling material and/or property-modifying components may be included in the bonding material for use in conjunction with this embodiment of the invention according to the desired properties of a composite to be formed.

EXAMPLES

Example I

Two 0.6 cm thick fused silica disks))having flat 2.5 cm outside diameter circular bonding surfaces, polished to better than 200 nm peak-to-valley, may be bonded in a Class 100 clean environment at room temperature. The bonding material consists essentially of a pure aqueous solution of KOH having a $KOH:H_2O$ molar ratio of 1:500. Water used to prepare the solution of KOH may be deionized and the solution filtered, for example, with a filter element of 0.2 micrometer or finer. The elimination of particulate matter having dimensions of 0.2 micrometer or larger enables the surface figures to dominate the interface thickness and wedging after application of the bonding material (aqueous solution of KOH).

The bonding material may be pipetted to one of the two surfaces to be bonded at a volume of between about 0.3 and 1.0 cubic millimeter. The two surfaces are then placed against each other to allow the capillary effect to spread out the bonding material solution uniformly. The two disks were stacked on top of each other, and the upper disk held against the lower disk by gravity of the upper disk. Surface tension of the bonding material may also play a role in holding the disks together. In this Example, the settling time is approximately 30 minutes. This time period is normally sufficient to allow any precision optical alignment to be performed, as needed.

Example II

An alternative process for bonding two fused silica disks of the type described in Example I, also according to the invention, may be performed as follows. An aqueous solution of NaOH and hydrated silicon dioxide, or an equivalent alkaline aqueous solution of sodium silicate, having a $NaOH:SiO_2:H_2O$ molecular ratio of 1.0:1.3:57.0 can be used as bonding material. When there is concern about large-particulate contamination, it is preferred that the bonding material be centrifuged at about 11,000 g for about 10 minutes. The upper portion of the resulting solution is then filtered as described in Example I. The bonding process may be conducted as described in Example I using the filtrate as bonding material. Using the method and bonding material of Example II, the settling time becomes as short as a few tens of seconds. Examples I and II illustrate how the settling time can be adjusted by varying the composition of the bonding material (namely, the concentration of hydroxide ions and silicate components).

Some commonalities between Examples I and II are as follows. Both procedures exhibit excellent success rate (>99%) in terms of creating 100% bonding coverage. A few hours after the bonding, both bonded assemblies can be safely handled in a regular laboratory environment. Approximately one week after the bonding, both bonded assemblies can survive violent glass machining, such as wet drilling. Both bonded assemblies reach their highest strength (on the order of several thousand psi) after curing for approximately one month. For the two aforementioned Examples I and II, NaOH may be substituted for KOH.

Although Examples I and II describe precision bonding of fused silica, the bonding method of the instant invention is also generally applicable to many other substrate materials. In practice, the bonding material described in Example II is applicable to a wider variety of substrate materials than that described in Example I.

Example III

In situations where it is either impossible or not required to obtain a near perfect figure match between the bonding surfaces, non-precision bonding may be performed according to the following Example. Example III uses a bonding material having a hydroxide-ions-generating component and a silicate material, but lacking a filling material component.

Bonding between two substrates may be performed as follows:

i) prepare an aqueous solution or suspension of sodium silicate, or a high pH aqueous solution or suspension of highly hydrated silicon dioxide (e.g., an aqueous solution containing ca. 14% NaOH and ca. 27% $SiO_2$, by weight;

ii) centrifuge, e.g., at about 11,000 g for 10 minutes to pellet any particulates which may be present;

iii) while avoiding particulate matter, carefully remove an aliquot of liquid from the lower portion of the supernatant, this liquid comprises a bonding material;

iv) apply the bonding material to at least one of the substrate surfaces to be bonded;

v) close the interface between the surfaces to be bonded; and v) allow one substrate to rest on top of the other substrate. optionally, the surfaces may be held in place by the application of a compressional force or weight in addition to that provided by the weight of the upper substrate.

Using the technique of Example III, the concentration of $SiO_2$ or silicate in the bonding material solution preferably approaches a maximal value for a given temperature.

Example IV

Assembly of a Laser Grade Doublet Lens

A precision laser grade doublet lens (achromat) system was assembled using a bonding method of the invention and a bonding material (similar to that used in Example III) including a source of hydroxide ions and a silicate material. Flawless transparency and 100% bonding coverage were achieved, even though the original figure mismatch was approximately 10 to 20 micrometers. In terms of alignment accuracy, the process of Example IV is a precision bonding. However, the bonding material (of Examples III and IV) is generally applicable to cases of non-precision bonding where the surface figure match is relatively unfavorable.

Examples I–IV demonstrate the feasibility of using bonding methods of the invention to assemble, in a very compact and reliable manner, optical systems (involving optical and optomechanical components and/or subassemblies of various materials) as well as systems in general.

Example V

Laser Radiation Tolerance of Bonded Silica Flats

Two fused silica flats which had been precision bonded according to the invention, showed no damage or degradation in optical or mechanical quality after passing a 1.06 micrometer (wavelength) continuous wave Nd:YAG laser beam (73 Watts, 4.84 mm (diameter) beam spot) through the bonded sample for 30 minutes. The above test was subsequently repeated at a power density of 1 Kilowatt/cm$^2$, the other parameters remaining the same, with the same result (i.e. no optical or mechanical degradation of the bond was observed).

In subsequent tests, two fused silica flats, which had been precision bonded according to the invention, were irradiated through the bonding interface-successively at different spots, each with a 1.06 micrometer (wavelength) Nd:YAG laser beam of 3 nanosecond pulse duration. The damage threshold at the interface ranges from 3 to 30 J/cm$^2$ in fluence, which corresponds to approximately 1 to 10 Giga-Watt/cm$^2$. (Some of the damage was known to be due to original surface defects prior to bonding.)

Hereinabove, applications of the invention were described separately in specific areas and/or for specific purposes. It will be apparent that an application can involve more than one aforementioned area and/or purpose. For example, it will be apparent to one skilled in the art that bonding materials and methods of the invention may be applied to underwater precision optical systems. It will also be clear to one skilled in the art that the above embodiments may be altered in many ways without departing from the scope of the invention. Accordingly, the scope of the invention should be determined by the following claims and their legal equivalents.

What is claimed is:

1. A method of assembling a system, comprising the steps of:
   a) providing first and second components having respective first and second surfaces to be bonded, wherein at least one of the first and second components is a precision optical component or an optomechanical component;
   b) providing a bonding material comprising water and a source of hydroxide ions;
   c) applying the bonding material to at least one of the first and second surfaces;
   d) aligning the first and second components to form a bonding material interface between the first and second surfaces; and
   e) while maintaining alignment of the first and second components, curing the bonding material interface.

2. The method of claim 1, wherein the bonding material interface after said step e) has a thickness in the range of from about 0.1 nm to about 2 μm.

3. The method of claim 1, wherein the system includes a precision optical system, and wherein the precision optical system is transmissive and the bonding material interface is resistant to a continuous wave laser beam having a power of 1 Kilowatt/cm$^2$ for a period of 30 minutes.

4. The method of claim 1, wherein the system includes a precision optical system, and wherein the precision optical system is transmissive and the bonding material interface has a damage threshold in the range of at least about 3 to about 30 J/cm$^2$ (in fluence) when irradiated with a 1.06 μm wavelength Nd:YAG laser beam of 3 nanosecond duration.

5. The method of claim 1, wherein the system includes a precision optical system selected from the group consisting of a doublet lens and a triplet lens.

6. The method of claim 5, wherein the system includes a triplet lens, the first component includes a first lens, the second component includes a second lens, and the bonding material interface forms a third refractive optical element.

7. The method of claim 1, wherein, after said step c), at least one of the first and second surfaces to be bonded has a plurality of hydroxyl groups thereon.

8. The method of claim 1, further comprising the step of, prior to said step c), cleaning at least one of the first and second surfaces to be bonded.

9. The method of claim 8, wherein said step of cleaning at least one of the first and second surfaces to be bonded includes at least one of: solvent rinsing, solvent touch-off, ultrasonic cleaning, ozone/hydrogen peroxide cleaning, deionized air cleaning, CO$_2$ snow cleaning, spin cleaning with a cleaning agent or solvent, UV-ozone cleaning, and RCA Clean cleaning.

10. The method of claim 1, further comprising the step of, prior to said step c), treating at least one of the first and second surfaces to generate a plurality of surface hydroxyl groups thereon.

11. The method of claim 1, wherein at least said steps c) and d) are performed in a cleanroom.

12. The method of claim 1, wherein the bonding material provided in said step b) comprises a source of hydroxide ions selected from the group consisting of: ammonia water, calcium hydroxide, potassium hydroxide, sodium hydroxide, strontium hydroxide, sodium ethoxide, and sodium polymetaphosphate.

13. The method of claim 1, wherein the bonding material comprises an aqueous solution of KOH or NaOH having a KOH:H$_2$O or NaOH:H$_2$O molar ratio in the range of from about 1:2000 to about 1:50.

14. The method of claim 1, wherein the bonding material comprises an alkaline aqueous solution including a silicate material.

15. The method of claim 14, wherein the alkaline aqueous solution comprises hydrated silicon dioxide and has a pH in excess of about 10.

16. The method of claim 14, wherein the alkaline aqueous solution comprises a silicate salt and has a pH in excess of about 10.

17. The method of claim 1, wherein at least one of the first and second components comprises doped or undoped materials selected from the group consisting of:

$Y_3Al_5O_{12}$
$Ca_2Al_2SiO_7$
$Gd_3Sc_2Al_3O_{12}$
$Y_3Sc_2Al_3O_{12}$
$CaY_4(SiO_4)_3O$
$Be_3Al_2Si_6O_{18}$
$Y_{3-x}Yb_xAl_5O_{12}$
$Nd_xY_{1-x}Al_3(BO_3)_4$
$La_{1-x}Nd_xMg_xAl_{12-x}O_{19}$ $Sr_{1-x} Nd_x Mg_x Al_{12-x} O_{19}$
$YAlO_3$
$BeAl_2O_4$
$Mg_2SiO_4$
$Y_3Fe_5O_{12}$
$LU_3Al_5O_{12}$
$Al_2O_3$ and
$CaCO_3$.

18. The method of claim 1, wherein said curing step comprises lowering the water content of the bonding material.

19. The method of claim 1, wherein the method further comprises the step of derivatizing the bonding material cured in said step e).

20. The method of claim 1, wherein said curing step is performed in air at a temperature in the range of from about 0° C. to about 1000° C.

21. The method of claim 1, wherein the bonding material interface is transparent to wavelengths in the visible light and near infrared range, and the bonding material interface results in negligible optical loss to the first and second components.

22. The method of claim 1, wherein the precision optical component is selected from the group consisting of: a lens, an optical flat, an optical filter element, a window, a waveplate, an optical fiber, a laser crystal, an optomechanical spacer, a fixture, a polarizing element, and a mirror.

23. The method of claim 1, wherein the precision optical component comprises a laser crystal.

24. A method of forming an object having a particular geometry comprising the steps of:
   a) providing a bonding material comprising a silicate material and a source of hydroxide ions;
   b) providing a mold for the object to be formed, wherein the mold comprises at least one surface;
   c) placing the bonding material on the at least one surface; and
   d) thereafter, at least partially curing the bonding material to provide the object, wherein the object is a transparent optical component.

25. The method of claim 24, wherein the object includes a surface comprising at least partially cured bonding material, and the method further comprises the step of:
   e) after said step c), derivatizing at least a portion of the surface of the object.

26. The method of claim 25, wherein the object exhibits differential absorption of certain wavelengths within the ultra-violet, visible, and infrared range.

27. The method of claim 25, wherein the bonding material is cured at a temperature in the range of from about 0° C. to about 1000° C.

28. The method of claim 25, wherein the object comprises a lens.

29. The method of claim 25, wherein the object is bonded to the at least one surface.

30. The method of claim 25, wherein the object is readily detachable from the surface.

31. The method of claim 24, wherein the mold comprises a plane surface.

32. The method of claim 24, further comprising the step of, prior to step c), removing unwanted gas from the bonding material.

33. The method of claim 24, wherein the bonding material provided in said step a) further comprises an additional component selected from the group consisting of a filling material and a property-modifying material.

34. The method of claim 33, wherein the filling material comprises a material selected from the group consisting of: silica; alumina; zirconia; BK7 glass; borosilicate; SF5 glass; SK11 glass; ultra-low thermal expansion coefficient glass; glass ceramic; silicon; germanium; granite; sand; clay particles; iron; copper; titanium; tungsten; aluminum; niobium; mild steel; stainless steel; brass; alloys of iron, copper, and aluminum; tin/lead alloys; oxides of iron, copper, niobium, nickel, tungsten, titanium, zirconium, and aluminum; ceramics; aluminum nitride; indium nitride; gallium nitride; gallium arsenide; germanium; calcite ($CaCO_3$); natural quartz; sapphire; yttrium aluminum garnet ($Y_3Al_5O_{12}$); rubbers, polystyrene, polypropylene; and SXA foam.

35. The method of claim 33, wherein the property-modifying material comprises a material selected from the group consisting of: metals, semiconductors, oxides of metals, oxides of semiconductors, dyes, and powders.

36. The method of claim 24, wherein the bonding material comprises an alkaline aqueous solution.

37. The method of claim 36, wherein the alkaline aqueous solution is selected from the group consisting of an alkaline aqueous solution of silicon dioxide and an alkaline aqueous solution of a silicate salt.

38. The method of claim 24, wherein the object has a thickness in the range of from about 1 $\mu$m to about 1 cm.

39. A method for making an optical lens, the method comprising the steps of:
   a) providing a surface of a substrate;
   b) providing a bonding material comprising a source of hydroxide ions and a silicate material;
   c) dispensing at least a first aliquot of the bonding material on the surface of the substrate; and
   d) curing the at least first aliquot of bonding material, wherein the at least first aliquot of bonding material assumes curvature, and wherein said curing provides a positive lens, wherein the lens comprises the cured bonding material.

40. The method of claim 39, wherein the surface of the substrate is readily detachable from the lens.

41. The method of claim 39, wherein the bonding material provided in said step b) comprises an aqueous solution including from about 5% to about 50% by weight of silicon dioxide and from about 2% to about 25% by weight of NaOH or KOH.

42. The method of claim 39 further comprising the step of derivatizing a surface of the lens.

43. A fused silica system, comprising:
   a) a first silica substrate;
   b) a second silica substrate; and
   c) a bonding material interface between said first silica substrate and said second silica substrate; wherein said bonding material interface is formed by at least partially curing a bonding material, said bonding material comprising a source of hydroxide ions and water, and wherein the composition of said bonding material can be varied to provide a mechanical Q value of the fused silica system over the range of from 1 to about $10^6$.

44. The bonded system of claim 43, wherein said source of hydroxide ions is selected from the group consisting of: ammonia water, calcium hydroxide, potassium hydroxide, sodium hydroxide, strontium hydroxide, sodium ethoxide, and sodium polymetaphosphate.

45. The bonded system of claim 43, wherein said bonding material further comprises a silicate material.

46. The bonded system of claim 43, wherein at least one of said first substrate and said second substrate comprises fused silica or fused quartz.

* * * * *